United States Patent
Endo et al.

(10) Patent No.: US 6,760,027 B2
(45) Date of Patent: Jul. 6, 2004

(54) BIRD'S-EYE VIEW FORMING METHOD, MAP DISPLAY APPARATUS AND NAVIGATION SYSTEM

(75) Inventors: Yoshinori Endo, Mito (JP); Toshio Fujiwara, Hitachi (JP); Hiroyuki Satake, Hitachi (JP); Hiroshi Shojima, Kashiwa (JP); Norimasa Kishi, Yokohama (JP); Masaki Watanabe, Yokohama (JP); Motoki Hirano, Tokyo (JP)

(73) Assignees: Hitachi, Ltd., Tokyo (JP); Nissan Motor Co., Ltd., Yokohama (JP); Xanavi Informatics Corporation, Zama (JP)

( * ) Notice: Subject to any disclaimer, the term of this patent is extended or adjusted under 35 U.S.C. 154(b) by 0 days.

(21) Appl. No.: 10/458,164

(22) Filed: Jun. 9, 2003

(65) Prior Publication Data

US 2003/0208316 A1 Nov. 6, 2003

Related U.S. Application Data

(63) Continuation of application No. 09/853,547, filed on May 11, 2001, which is a continuation of application No. 09/497,932, filed on Feb. 4, 2000, now Pat. No. 6,346,942, which is a continuation of application No. 08/632,791, filed on Apr. 17, 1996, now Pat. No. 6,141,014.

(30) Foreign Application Priority Data

Apr. 20, 1995 (JP) ............................................. 7-95535

(51) Int. Cl.[7] .............................................. G06T 11/60
(52) U.S. Cl. ...................................................... 345/427
(58) Field of Search ................................ 345/427, 418, 345/419, 421, 853; 701/209–212, 28, 201; 340/995, 990

(56) References Cited

U.S. PATENT DOCUMENTS 4,940,972 A    7/1990    Mouchot et al. ............ 345/421
4,952,922 A    8/1990    Griffin et al. ............... 345/421

(List continued on next page.)

FOREIGN PATENT DOCUMENTS

| JP | 1-219883 | 9/1983 |
|----|----------|--------|
| JP | 1-219883 | 9/1989 |
| JP | 1-263688 | 10/1989 |
| JP | 002599 | 1/1990 |
| JP | 2-244188 | 9/1990 |
| JP | 5-203457 | 8/1993 |
| JP | 5203457 | 8/1993 |
| JP | 5-265436 | 10/1993 |
| JP | 6-90041 | 11/1994 |
| KR | 10-1996-0011943 | 3/2003 |

Primary Examiner—Mark Zimmerman
Assistant Examiner—Huedung X. Cao
(74) Attorney, Agent, or Firm—Antonelli, Terry, Stout & Kraus, LLP

(57) ABSTRACT

In a navigation system using a bird's-eye view display mode, map data on a plan view map are subjected to a perspective projection conversion to obtain drawing data on a bird's-eye view map. An input of the position of a view point is accepted, and a projection plane for a bird's-eye view is determined so that the display positions of the two points which have been subjected to perspective-projection conversion are coincident with predetermined positions. Alternatively, an input of a scale is accepted, so that the display positions of the two points after the perspective projection conversion are coincident with predetermined positions and the drawing scale is coincident with the input scale. In a further alternative, an input of the projection angle is accepted, and the projection plane is determined on the basis of the projection angle and the position of the view point.

6 Claims, 17 Drawing Sheets

U.S. PATENT DOCUMENTS

| | | | |
|---|---|---|---|
| 5,088,054 A | 2/1992 | Paris, II | 345/421 |
| 5,161,886 A | 11/1992 | De Jong et al. | 701/209 |
| 5,448,696 A | 9/1995 | Shimada et al. | 345/853 |
| 5,904,725 A | 5/1999 | Iisaka et al. | 501/207 |
| 5,917,436 A | 6/1999 | Endo et al. | 340/995.14 |
| 5,964,810 A | 10/1999 | Hirano et al. | 701/28 |
| 5,974,876 A | 11/1999 | Hijikata et al. | 73/178 |
| 6,011,494 A * | 1/2000 | Watanabe et al. | 340/995.14 |
| 6,141,014 A | 10/2000 | Endo et al. | 345/427 |
| 6,169,552 B1 | 1/2001 | Endo et al. | 345/427 |
| 6,252,602 B1 * | 6/2001 | Matsuda et al. | 345/589 |

* cited by examiner

REGION TO BE DISPLYED IN BIRD'S-EYE VIEW

VIEW POINT AND PROJECTION ANGLE

OBTAINED BIRD'S-EYE VIEW DISPLAY

REGION TO BE DISPLYED IN BIRD'S-EYE VIEW

VIEW POINT AND PROJECTION ANGLE

OBTAINED BIRD'S-EYE VIEW DISPLAY

WITH NO CHARACTER REARRANGING PROCESSING

WITH CHARACTER REARRANGING PROCESSING

WITH NO CHARACTER DRAWING
SELECTING PROCESSING

WITH CHARACTER DRAWING
SELECTING PROCESSING

REGION TO BE DISPLYED IN BIRD'S-EYE VIEW

VIEW POINT AND PROJECTION ANGLE

OBTAINED BIRD'S-EYE VIEW DISPLAY

REGION TO BE DISPLYED IN BIRD'S-EYE VIEW

VIEW POINT AND PROJECTION ANGLE

OBTAINED BIRD'S-EYE VIEW DISPLAY

BIRD'S-EYE VIEW FORMING METHOD, MAP DISPLAY APPARATUS AND NAVIGATION SYSTEM

CROSS-REFERENCE TO RELATED APPLICATIONS

This is a continuation of application Ser. No. 09/853,547 filed May 11, 2001, now U.S. Pat. No. 6,654,014 B2, which is a continuation of application Ser. No. 09/497,932 filed Feb. 4, 2000, now U.S. Pat. No. 6,346,942 B1, which is a continuation of application Ser. No. 08/632,791 filed Apr. 17, 1996, now U.S. Pat. No. 6,141,014 A, the contents of all of which are incorporated herein by reference in their entirety.

BACKGROUND OF THE INVENTION

1. Field of the Invention

The present invention relates to a navigation system for detecting the position of a moving body to inform a user of the current position of the moving body, and a map display apparatus using the navigation system.

2. Description of Related Art

Various types of navigation systems have been recently known, and these navigation systems are used while mounted on moving bodies such as vehicles, ships, etc. When such a navigation system is mounted on a moving body, it performs arithmetic and logic processing on information provided from various sensors to detect the current position of the moving body and display the current position on a screen of the navigation system.

This type of navigation system includes a position detector for detecting the absolute position of the moving body, a storage device for storing map data which include two-dimensional vector data obtained by projecting roads and points on the ground, such as structures, etc., onto a mesh-segmented plane using a universal transverse Mercator projection method, and character data associated with the vector data, an input device for receiving external instructions (commands), and a display device for reading out desired vector data from the mesh-segmented map stored in the storage device in accordance with an instruction input from the input device, to perform data conversion processing on the data, and then displaying the map on the display.

The data conversion processing includes shift conversion processing for changing the display position on a map, scale conversion (enlarging/reducing) processing for displaying a map on any scale, and rotational coordinate-transformation processing for changing a display direction on the map. With these processings, a plan view map is obtained by drawing the ground through an orthogonal projection in a vertical direction.

As described above, when a map is displayed on the screen, the conventional navigation system as described above adopts a plan-map display mode in which the ground is drawn in the vertical orthogonal projection style. Therefore, in order to simultaneously display two spots which are far away from each other, a reduction-scale of the map must be necessarily increased, and thus detailed information cannot be displayed on the screen.

SUMMARY OF THE INVENTION

An object of the present invention is to provide a bird's-eye view forming method for displaying a map of a plane (ground) on the basis of a bird's-eye view corresponding to a projected plan of the plane (ground) which is obtained by projecting the plane (ground) on any plane between the plane (ground) and a view point when the plane (ground) is viewed from the view point located at any height from the plane (ground), a map display apparatus using the bird's-eye view forming method, and a navigation system using the map display apparatus.

In order to attain the above object, a bird's-eye view forming method for forming, from map data, drawing (display) data for a map which is to be represented by a bird's-eye view, is characterized in that coordinate data contained in the map data are perspectively converted to drawing (display) data based on a bird's-eye view on a desired projection plane with a view point being set to a desired position (i.e., the coordinate data of the map data on a vertical orthogonal projection plane are perspectively converted to drawing (display) data on a desired projection plane based on a bird's-eye view).

The bird's-eye view forming method preferably includes a step of receiving an input of the position of the view point, and a step of determining the projection plane so that the drawing (display) positions of two predetermined spots (for example, a current position and a destination) which are obtained through a perspectively projecting transformation on the basis of the coordinates of the two spots in the map data and the position of the view point, are set to predetermined positions. (Here, the perspectively projecting conversion is defined as such a data conversion that data on a plan view are converted to data on a bird's-eye view through a perspective projection operation. Therefore, by using the perspectively projecting conversion, a plan-view map is converted to a bird's-eye view map. In the following description, the perspectively projecting conversion is merely referred to as "perspective projection").

Alternatively, the bird's-eye view forming method may include a step of receiving an input of a scale, and a step of determining the position of the view point and the projection plane so that the drawing (display) positions of the two predetermined spots (for example, a current position and a destination) which are obtained by performing the perspective projection on the basis of the coordinates of the two spots in the map data and the input scale, are set to predetermined positions, and a scale of a drawn (displayed) map is equal to the input scale.

Further, the bird's-eye view forming method may include a step of receiving an input of a projection angle which is defined as an angle at which a plane defined for the map data and the projection plane intersect each other, and a step of determining the projection plane on the basis of the input projection angle and the set view point position.

Still further, according to the present invention, there are provided a map display apparatus for displaying a bird's-eye view by using the bird's-eye view forming method as described above, and a navigation system for displaying a map by using the map display apparatus.

According to the bird's-eye view display apparatus and the navigation system, map drawing means includes coordinate transforming means, and the coordinate transforming means performs the perspective projection (conversion) on the map data to convert a plan-view map to a bird's-eye view map, and to display the converted map on a screen. Therefore, according to the present invention, a user can obtain a bird's-eye view display which is easy to see and in which the user can easily recognize the positional relationship of spots displayed on the map. According to the bird's-eye view forming method of the present invention, the view point can be freely set, so that it can meet user's need.

According to the present invention, a navigation system which is excellent in operational performance and convenient for a user can be obtained if it is designed to overcome the following first to seventh problems.

Firstly, in the case where the processing speed of scroll processing in a bird's-eye view display mode is lower than that in a plan display mode, the operational performance may be degraded when, the scroll processing is frequently used to search for a desired spot on the bird's-eye view display (first problem).

Therefore, it is preferable in the present invention that the plan view (plan map) display mode and the bird's-eye view display mode are freely switchable. With this switching operation, both the plan view display and the bird's-eye view display can be made in accordance with a user's requirement, and thus the convenience is enhanced.

In the above case, a second problem occurs, namely, that it is difficult for the user to grasp the positional relationship between two different type of view when display is switched between the plan view display and the bird's-eye view display. This is because the position of the same spot to be displayed on the screen varies significantly due to variation of the view point with respect to the map, when the display switching operation is performed, and further, spots which have not been displayed or have been displayed until the display switching time are respectively displayed or are not displayed at the display switching time.

Therefore, if the present invention is designed so that the display is freely switchable the plan view display and the bird's-eye view display, it is further preferable that an intersecting angle between a plane containing the map data and a plane onto which the map is projected, is gradually increased or reduced in time series. That is, according to the present invention, it is preferable that the view point is smoothly shifted during the conversion between the plan view display and the bird's-eye view display. With this operation, the shift between the plan view and the bird's-eye view is smoothly performed, and thus the user can easily recognize the positional relationship between spots displayed on the plan view map and the same spots displayed on the bird's-eye view map.

Thirdly, when the map is displayed in the bird's-eye view display mode, if the view point serving as a parameter to the perspective projection is fixed to a position, a mark indicating the current position which is displayed on the screen is shifted on the map while the current position is shifted. In this case, if the marked current position deviates from a displayed map area, the mark of the current position is not displayed (third problem).

Therefore, according to the present invention, the view point from which to obtain the bird's-eye view may be fixed to a specific position which is set to be away from the current position at a fixed distance and in a fixed direction at all times. Furthermore, the height of the view point may be varied in accordance with an external operation. If the view point is fixed to the specific position as described above, the bird's-eye view is displayed such that the current position is fixed to a point on the screen at all times, so that the user can easily grasp the current position. Furthermore, if the position of the view point can be set to a user's desired position, the convenience can be further enhanced.

Fourthly, when two spots are displayed on the same frame, it is sufficient in the conventional plan view display to renew the scale in accordance with the distance between the two points. However, in the bird's-eye view display of the map, the map cannot be optimally displayed by merely renewing the scale (fourth problem).

Therefore, according to the present invention, an instruction regarding the positions of two spots (for example, the current position and the destination) may be accepted, and the view point and the intersection angle between the map-projected plane (bird's-eye view) and the plane containing the map data (plan view) may be determined so that the two spots are displayed at predetermined positions on the screen, whereby the bird's-eye view display is performed. With this operation, the positional relationship between the two spots can be easily recognized. Further, even when the positions of the two spots vary, these are displayed on the same frame at all times, so that the user can grasp the positional relationship between the two spots with no complicated operation.

According to the present invention, in the bird's-eye view display mode, line backgrounds such as roads, railroad lines, etc., plane backgrounds such as rivers, green zones, etc., and character strings may be perspectively converted and drawn on the bird's-eye view map. However, if the character strings are perspectively converted, the shape of a character is smaller and is more deformed as it becomes farther away from the view point. On the other hand, if it is in the vicinity of the view point, it is enlarged. Thus the character strings may be illegible in these cases (fifth problem).

Therefore, it is preferable that the coordinate transforming means of the present invention does not perform the perspective projection on a character image. In this case, characters contained in the bird's-eye view are displayed at the same size, so that the character strings are easily legible.

Further, when a lot of character data are displayed, character strings are displayed while overlapping with one another. Particularly in the bird's-eye view, an angle of depression with respect to the view point is smaller at a far-distance point from the view point and thus the reduction scale is large at that point, so that the data amount of character data to be displayed per unit area is increased. Accordingly, the character data (strings) are liable to be overlapped with each other at the far-distance point (sixth problem).

Therefore, it is preferable that as the position of character data contained in the map data becomes nearer to the view point, drawing (display) judgment means of the present invention displays the character data more preferentially (i.e., increases the display priority rank of the character data). With this operation, character data having a higher display priority rank may be displayed while being superposed on character data having a lower display priority rank, so that the character string can be prevented from being deficient and it can be made legible.

When the current position is located in the vicinity of the bottom side of the display frame or the view point, it is preferable that the display height or the distance from the view point is set as a criterion for determining the display priority rank. Further, when two or more character strings are displayed while overlapping with one another, a character string which is displayed at a lower display height (which is the height from the bottom side of the display frame) on the screen may be displayed more preferentially (i.e., so that the character string is not covered by the other character strings, but is superposed on the other character strings). In this case, the character data near to the current position are displayed while being prevented from being covered by the other character strings and thus missed. With this display operation, the deficiency (missing) of the character information (string) near to the current position which the user has a greater need for can be prevented, and the character string can be made legible.

As described above, when the bird's-eye view display is performed, the data amount of line data, plane background data and character data to be drawn per unit area is increased in a region which is far away from the view point (hereinafter referred to as "far-distance region", and this region is a region having a small angle of depression). Accordingly, when the character data of these data are drawn while superposed on the other data, the line data and the plane background data are covered by the character data in the far-distance region, so that it may be difficult to check the shapes of roads, etc. in the far-distance region (seventh problem).

Therefore, the drawing judgment means of the present invention preferably eliminates, from targets to be drawn (displayed), those character strings which are obtained through the perspective projection of the map and which are located at positions higher than a predetermined display height from the bottom side of the display frame. Or the drawing judgement means may eliminate those character strings which are defined at position where is further than a fixed distance from the view point. As described above, the character strings are not displayed (drawn) in a region which is located above the predetermined height or is more than at a predetermined distance away, that is, in a region where the data amount to be drawn per unit area is considerably increased due to the reduction in angle of depression in the bird's-eye view display mode. Therefore, a road display, a plane background display, etc. are not covered by the character string display, so that the recognition of roads in the far-distance regions can be prevented from being impaired even in the bird's-eye view display mode.

DETAILED DESCRIPTION OF THE PREFERRED EMBODIMENTS

A preferred embodiment according to the present invention will be described with the accompanying drawings. In the following embodiment, the navigation system is mounted on a vehicle such as a car or the like, but, the same effect can be obtained when the navigation system is mounted on other moving bodies such as a ship, a train, etc.

Figure 1:
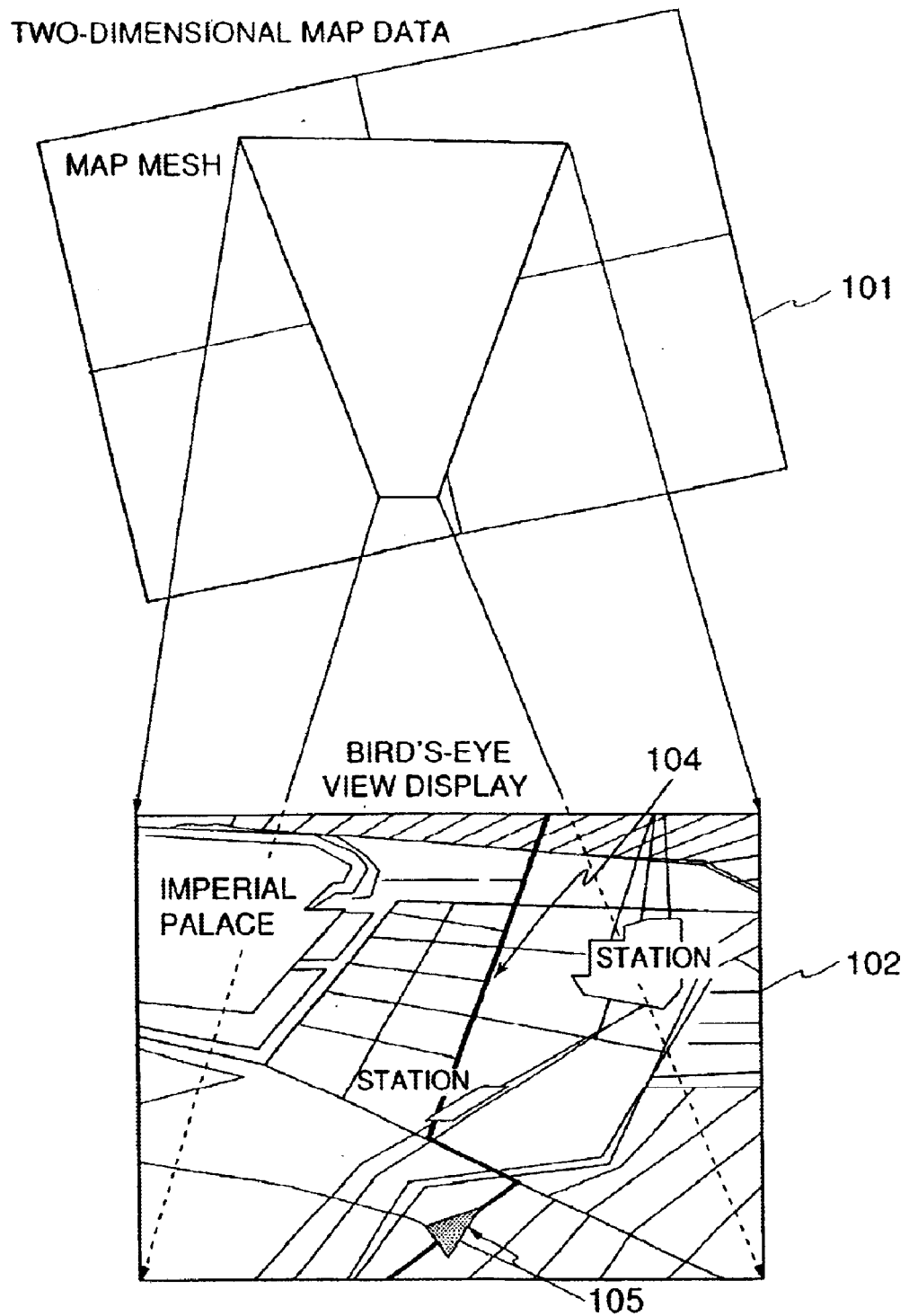
FIG. 1 is a diagram showing an example of a bird's-eye view display drawn (displayed) according to the present invention.

FIG. 1 shows a bird's-eye view which is displayed by a bird's-eye view map display apparatus installed in a navigation system of an embodiment according to the present invention. The bird's-eye view map display apparatus of this embodiment forms a bird's-eye view showing a landscape obtained through a bird's eye as a projection drawing of two-dimensional map data (represented by reference numeral 101 in FIG. 1), and displays it on a display screen of a display. Here, the bird's-eye view is defined as a view of a landscape which is obtained as if it is viewed through the eyes of a bird flying at a specific position which is high above the ground.

In FIG. 1, reference numeral 102 represents a bird's-eye view. In the bird's-eye view 102, a route 104 which is emphatically displayed to indicate a travel course (the emphasis is made with a bold line as shown in FIG. 1, but, it may be made using flashing display or discoloration), and reference numeral 105 represents a mark (symbol) indicating the current position. In FIG. 1, arrows (indicated by solid lines and dotted lines) represent a projection from the two-dimensional map data 101 to the bird's-eye view 102.

Figure 17:
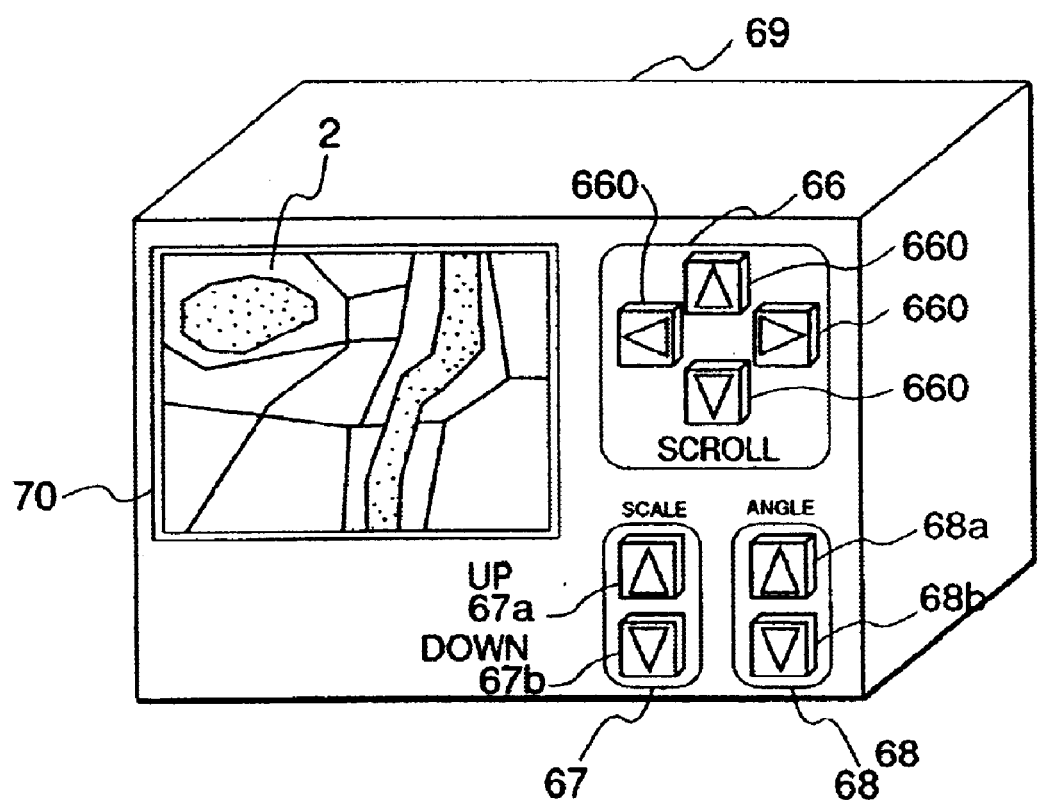
FIG. 17 is a perspective view showing the outlook of the navigation system of the embodiment.

FIG. 17 is a perspective view showing the outlook of the navigation system for a vehicle according to the embodiment. The navigation system of this embodiment is installed in a housing 69, and the housing 69 is equipped with a display screen of the display 2, a scroll key unit 66, a scale changing key unit 67, a projection angle changing key unit 68, a touch panel 70 provided on the display screen of the display 2, etc.

The scroll key unit 66 is responsive to a scroll instruction of an image displayed on the display screen, and has four direction-instruction keys 660 which are responsive to shift-up, shift-down, shift-to-right, shift-to-left instructions, respectively. The scale changing key unit 67 is responsive to an instruction of changing the scale of a map displayed on the screen, and has two scale instructing keys 67a and 67b which are responsive to scale-up and scale-down instructions, respectively. The projection angle changing key unit 68 is responsive to an instruction to change the angle of a projection plane of a bird's-eye view to be displayed on the screen, and has two angle instruction keys 68a and 68b which are responsive to projection-angle increasing and decreasing instructions, respectively. The touch panel 70 serves as an input means which detects a touch (contact) to the surface thereof to output a touched position on the surface thereof. The keys 66 to 68 may be designed as a software key which is triggered through the touch to a predetermined region on the touch panel 70.

Figure 2:
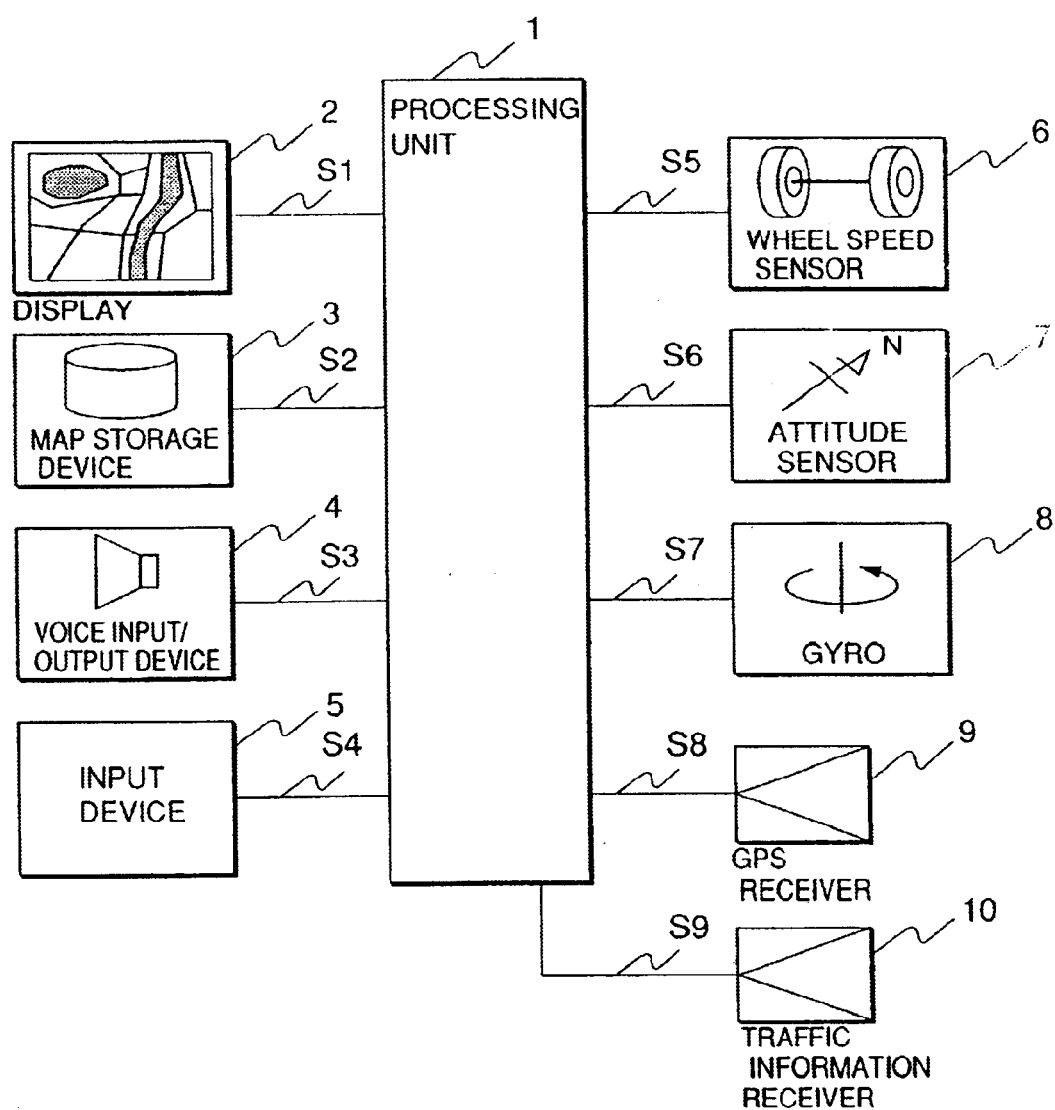
FIG. 2 is a diagram showing a navigation system of an embodiment according to the present invention.

As shown in FIG. 2, the navigation system for a vehicle according to this embodiment includes a processing unit 1, a display 2 which is connected to the processing unit 1 through a signal line S1, a map storage device 3 which is connected to the processing unit 1 through a signal line S2, a voice input/output device 4 which is connected to the processing unit 1 through a signal line S3, an input device 5 which is connected to the processing unit 1 through a signal line S4, a wheel speed sensor 6 which is connected to the processing unit 1 through a signal line S5, an attitude (geomagnetic) sensor 7 which is connected to the processing unit 1 through a signal line S6, a gyro 8 which is connected to the processing unit 1 through a signal line S7, a GPS (Global Positioning System) receiver 9 which is connected to the processing unit 1 through a signal line S8, and a traffic information receiver 10 which is connected to the processing unit 1 through a signal line S9. Each of the signal lines S1 to S9, may be either wire type or wireless type is used insofar as these types of signal lines can transmit signals. In this embodiment, the wire type is used.

The processing unit 1 is a central unit for performing various processing. For example, it detects the current position on the basis of information output from the various sensors 6 to 9, and reads desired map information from the map storage device 3 on the basis of the obtained current position information. In addition, it graphically develops map data to display the map data while overlapped with a current-position mark, and selects the optimum road which connects the current position and a destination instructed by the user to inform the user of the optimum course with voice or graphic display.

The display 2 serves to display graphic information generated in the processing unit 1, and it comprises a CRT or a liquid crystal display. RGB (Red, Green, Blue) signals or NTSC (National Television System Committee) signals are normally transmitted along the signal line S1 between the processing unit 1 and the display 2, like a normal system.

The map storage device 3 includes a large-capacity storage medium such as a CD-ROM (Compact Disk-Read Only Memory) or IC (Integrated Circuit) card, and it performs a read-out operation of reading out data held in the large-capacity storage medium in response to an instruction of the processing unit 1 to supply the data to the processing unit 1, and a write-in operation of writing data supplied from the processing unit 1 into the large-capacity storage medium.

The voice input/output device 4 serves to convert a message produced in the processing unit 1 to a voice message to a user, and it also serves to receive a voice input and recognize the content thereof and to transmit the information to the processing unit 1.

The input device 5 serves to receive an instruction input externally, and it includes the scroll key unit 66, the scale changing key unit 67, the projection angle changing key unit 68 and the touch panel 70 in this embodiment. The input device 5 of the present invention is not limited to the above construction, and another input means such as a joy stick, a keyboard, a mouse, a pen input device or the like may be used.

The navigation system of this embodiment has various sensors such as a wheel speed sensor 6 for measuring the distance on the basis of the product of the circumferential length of the wheels of a vehicle and the detected number of rotations of the wheels, and measuring a turn angle of the vehicle on the basis of the difference in number of rotations between the paired wheels, an attitude (geomagnetic) sensor 7 for detecting the earth's magnetic field to measure a direction in which the vehicle is oriented, a gyro 8 such as an optical fiber gyro, a vibrational gyro or the like for measuring a rotational angle of the vehicle, and a GPS receiver 9 for receiving signals from three or more GPS satellites to measure the distance between the vehicle and each of the GPS satellites, and variation of the distance, thereby measuring the current position, the travel direction and the travel azimuth (bearing) of the vehicle. The sensors of the present invention are not limited to the above sensors. For example, in a navigation system mounted in a ship, a Doppler sonar is used to detect the speed of the ship, and any sensor may be suitably selected in accordance with its use purpose.

Further, the navigation system of this embodiment has a traffic information receiver 10 to receive signals from beacon transmitters or FM (Frequency Modulation) broadcasting stations which transmit traffic information such as information on traffic jams, road repairs and suspension of traffic, and information on parking areas.

Figure 3:
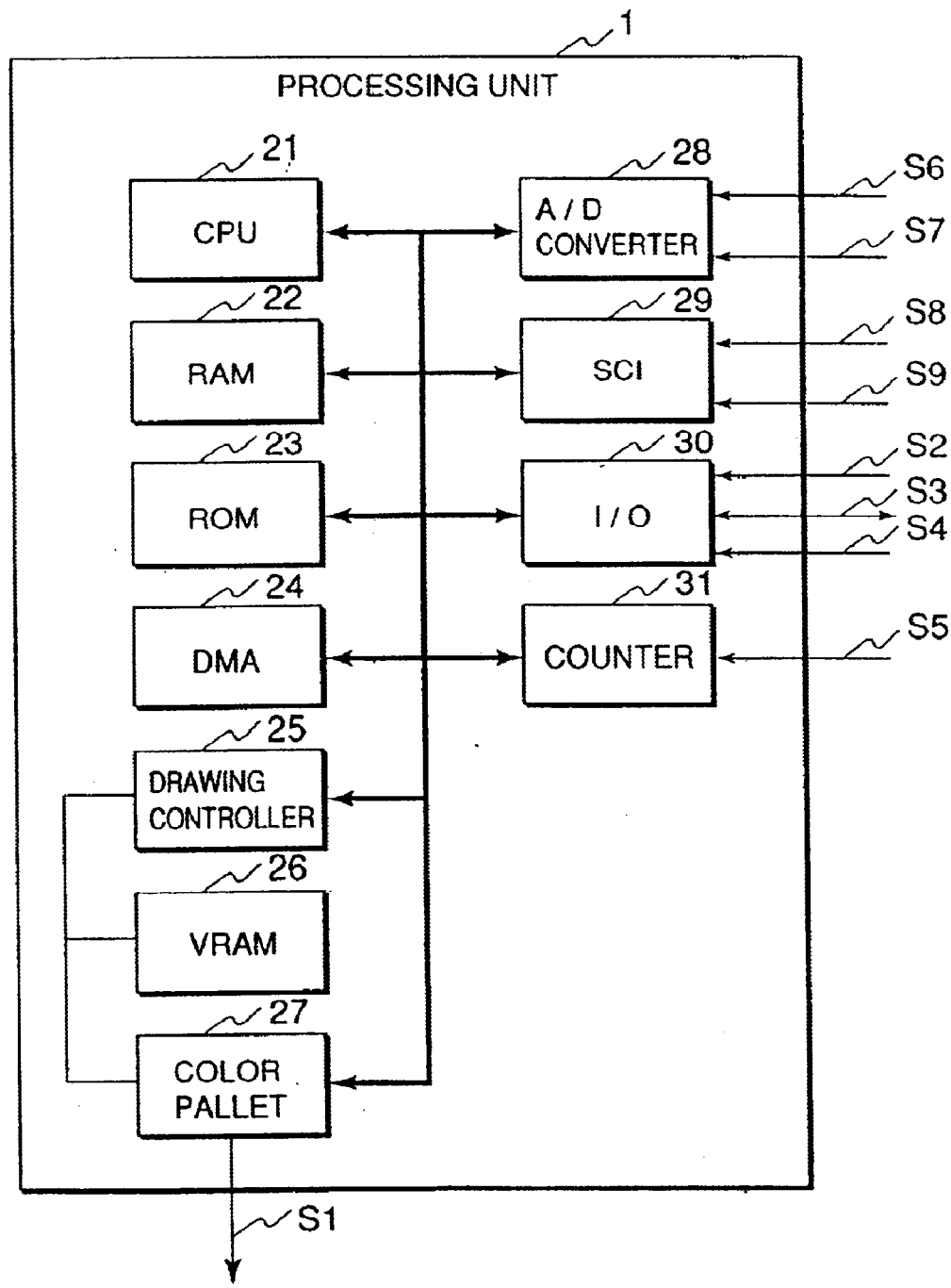
FIG. 3 is a block diagram showing a hardware construction of a processing unit.

FIG. 3 shows the hardware construction of the processing unit 1 as described above. The processing unit 1 includes a CPU (Central Processing unit) 21 for performing a numerical operation and a control operation of the devices 22 to 31, a RAM (Random Access Memory) 22 for holding maps and processing data, a ROM (Read Only Memory) 23 for holding programs, a DMA (Direct Memory Access) 24 for performing data transmission between memories and between memories and respective devices at high speed, a drawing controller 25 for performing a graphics drawing operation when developing vector data to an image at high speed and performing a display control, a VRAM (Video Random Access Memory) 26 for storing graphic image data, a color pallet 27 for converting the image data to RGB signals, an A/D (Analog/Digital) converter 28 for converting analog signals to digital signals, an SCI (Serial Communication Interface) 29 for converting serial signals to parallel signals which are synchronized with a bus, an I/O (Input/Output) device 30 for synchronizing serial signals with parallel signals, then sending the synchronized serial signals into the bus, and a counter 31 for integrating a pulse signal. These devices 21 to 31 are connected to one another through the bus.

Next, the functional construction of the processing unit 1 will be described with reference to FIG. 4.

Figure 4:
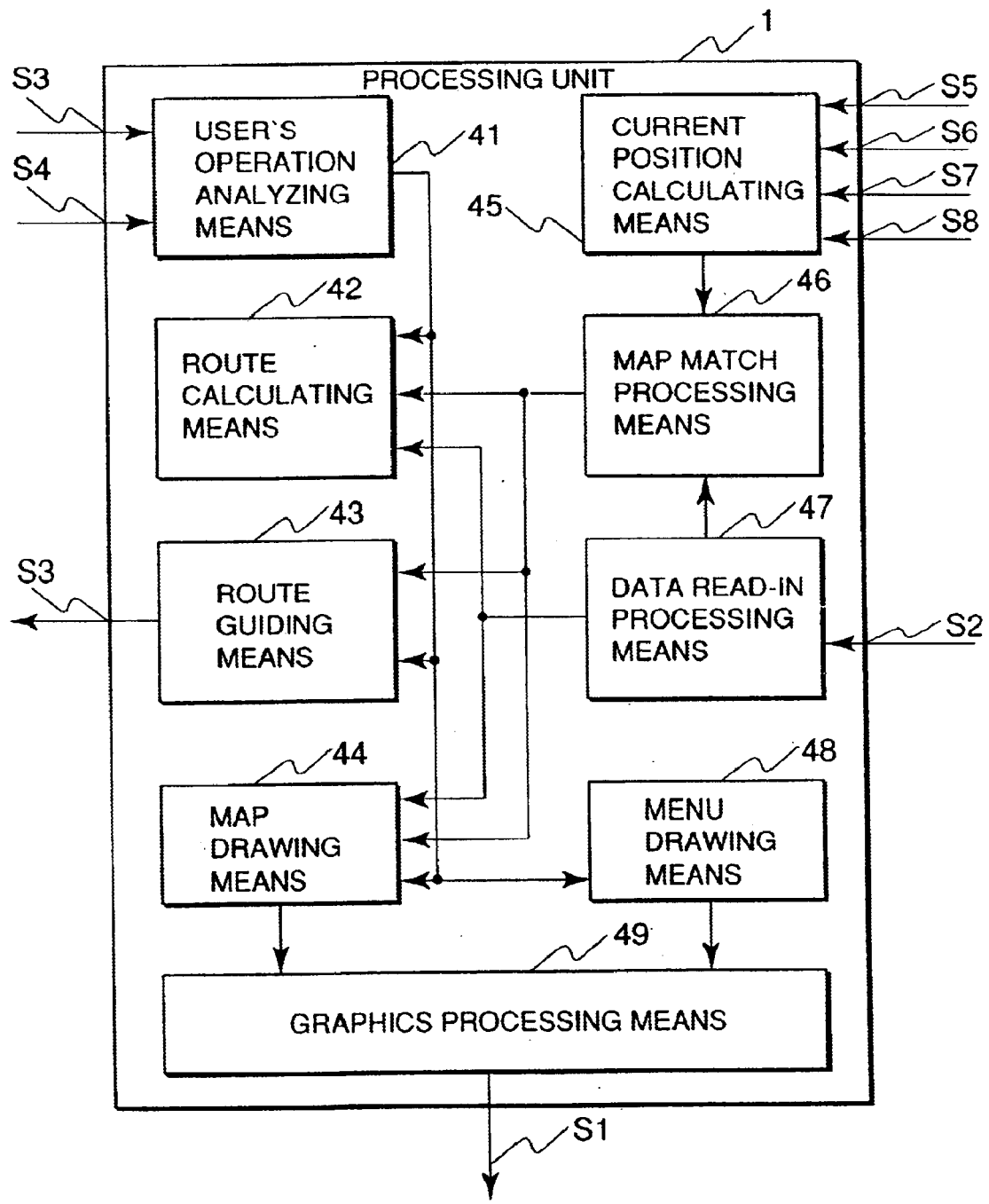
FIG. 4 is a functional block diagram showing the processing unit.

The processing unit 1 includes user's operation analyzing means 41, route calculating means 42, route guiding means 43, map drawing means 44, current position calculating means 45, map match processing means 46, data read-in processing means 47, menu drawing means 48, and graphics processing means 49 as shown in FIG. 4. In this embodiment, each of these means 41 to 49 is implemented through execution of instructions stored in the ROM. 23 by the CPU 21. However, the present invention is not limited to the above implementation, and each of the means may be implemented using a hardware construction such as a dedicated circuit or the like.

The current position calculating means 45 serves to time-integrate distance data and angle data which are obtained by integrating distance pulse data measured by the wheel speed sensor 6 and angular velocity data measured by the gyro 8, to calculate the current position (X', Y') of a vehicle after travel on the basis of an initial position (X, Y). Here, the current position calculating means 45 corrects the absolute azimuth of the vehicle travel direction on the basis of the azimuth data obtained by the attitude sensor 7 and the angle data obtained by the gyro 8 so that an angle by which the vehicle has been rotated is matched with a vehicle travel azimuth. When the data obtained by the sensors are integrated as described above, errors of the sensors are accumulated. Therefore, the current position calculating means 45 also performs correction processing so that the accumulated errors are canceled on the basis of positional data obtained by the GPS receiver 9 at a predetermined time interval (every one second in this embodiment) to output the corrected data as current position information.

As described above, the current position information thus obtained still, contains minute errors due to the sensors. Therefore, in order to enhance the positional precision of the navigation system, a map match processing is performed by the map match processing means 46. In this processing, data of roads contained in a map around the current position which are read in by the data read-in processing means 47 are compared with a travel locus obtained by the current position calculating means 45 to match the current position to a road which has the highest correlation in shape. In many cases, the current position can be matched to the travel road through the map match processing, so that the current position information can be output with high precision.

The user's operation analyzing means 41 analyzes a user's demand or instruction which is input through the input device 5 by the user, and controls the units 42 to 48 to perform the processing corresponding to the demand (instruction). For example, when a demand for route guidance to a destination is input, the user's operation analyzing means 41 instructs the map drawing means 44 to display a map to set the destination, and then instructs the route calculation means 42 to determine a route extending from the current position to the destination and instructs the route guide means 43 to supply the route guidance information to the user.

The route calculation means 42 searches a node connecting two specified points by using a Dijkistra method or the like to obtain a route having the highest priority. The route calculating means 42 has plural criteria for the priority order, and it uses a criterion indicated by a user's instruction to determine the route. In this embodiment, in accordance with the instruction, there can be obtained a route providing the shortest distance between the two points, a route along which the vehicle can reach to the destination in the shortest time, a route in which cost is cheapest, or the like.

The route guide means 43 compares link information of a guide route obtained by the route calculating means 42 with the current position information obtained by the current position calculating means 45 and the map match processing means 46. Before passing through a crossing or the like, it outputs direction-instructing information to the voice input/output device 4 indicating whether the vehicle should go straight, or whether the vehicle should turn to the right or left, whereby the information is output as a voice message, or a direction in which the vehicle should travel is drawn on a map displayed on the screen of the display 2.

The data read-in processing unit 47 operates to prepare for the read-in operation of map data of a desired region from the map storage device 3. The map drawing means 44 receives from the data read-in processing means 47 the map data around a position for which the display is instructed, and it operates to transmit to the graphics processing means 49 a command for drawing specified objects on a specified reduction-scale with a specified direction set to an up-direction.

The menu drawing means 48 receives a command output from the user's operation analyzing means 41, and transmits to the graphics processing means 49 a command for drawing demanded various menus.

The graphics processing means 49 receives drawing commands generated by the map drawing means 44 and the menu drawing means 48 to develop an image in the VRAM 26.

Figure 5:
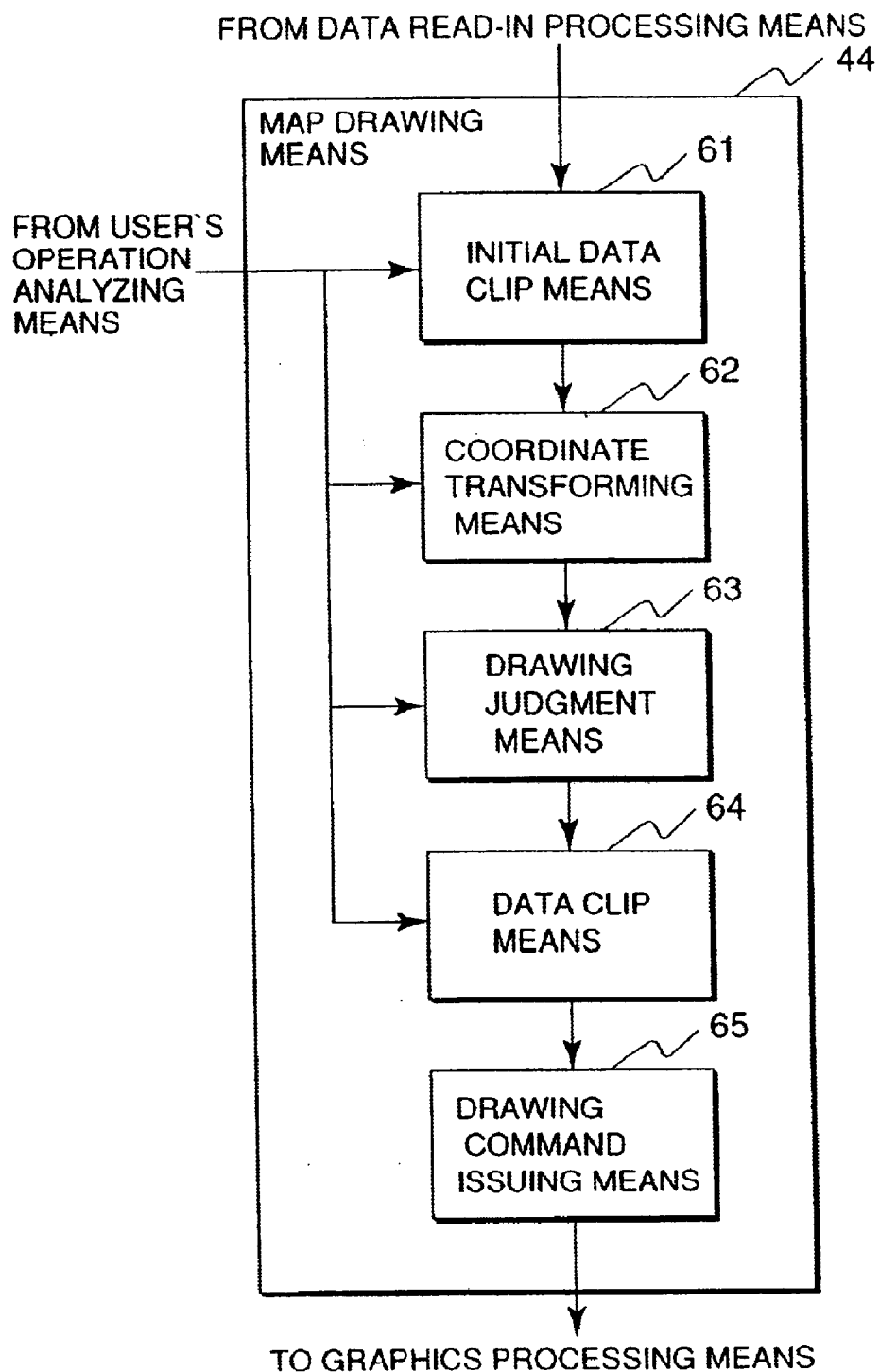
FIG. 5 is a functional block diagram showing map drawing means.

Next, the function of the map drawing means 44 will be described with reference to FIG. 5. the map drawing means 44 includes initial data clip means 61, coordinate transforming means 62, drawing judgment means 63, data clip means 64 and drawing command issuing means 65.

The initial data clip means 61 performs clip processing to select road data, plane and line background data and character data on a region, which are required for subsequent processing, from each mesh of map data read out from the map storage device 3 by the data read-in processing means 47, and supplies the selection result to the coordinate transforming means 62. In this embodiment, the initial data clip means 61 is actuated at a time interval (period) for renewing drawn map (for example 0.5 seconds) or it is actuated in accordance with an instruction from the user's operation analyzing means 41.

As algorithms for the clip processing Cohen-Sutherland line clip algorithm for the road data and the line data, Sutherland-Hodgman polygon clip algorithm for the plane data, etc. are used, (Foley, van Dam, Feiner, Hughes: Computer Graphics: Addison-Wesley Publishing Company pp.111–127). With this processing, the amount of data which will be subsequently subjected to the coordinate projection or the drawing processing can be reduced, so that the processing speed is expected to be higher.

The coordinate transforming means 62 performs processing for transforming each coordinate value of the map data obtained in the clip processing, such as enlargement/reduction processing, rotation processing and projection processing of the map data. The coordinate transforming means 62 is actuated in accordance with an instruction from the initial data clip means 61 or the user's operation analyzing means 41.

The drawing judgement means 63 operates to select those data which are contained in the map data obtained by the coordinate transforming means 62 and actually required to be drawn. For example, when the reduction-scale is large, the drawing judgment means 63 operates to omit narrow roads or omissible place names because of the substantial increase in the amount of data to be drawn. With this operation, the processing speed for the drawing can be prevented from being significantly reduced. The drawing judgment means 63 is actuated in accordance with an instruction from the coordinate transforming means 62 or the user's operation analyzing means 41.

The data clip means 64 operates to select the map data on the drawing region from the map data obtained by the drawing judgment means 63 through the clip processing. The same algorithms as the initial data clip means may be used by the data clip means 64. The data clip means 64 is actuated in accordance with an instruction from the drawing judgment means 63 or the user's operation analyzing means 41. The data clip means 64 may be omitted.

The drawing command issuing means 65 operates to issue to the graphics processing unit 49 commands for drawing lines, polygons, characters, etc. and commands for setting patterns to drawn roads, planes, lines, background data, character data, etc. with indicated colors or patterns. The drawing command issuing means 65 is actuated in accordance with an instruction from the data clip means 64.

In this embodiment, the initial data clip means 61 is actuated at a time interval (period) for renewing a drawn map (for example, every 0.5 seconds), and it transmits the data obtained in the clip processing to the coordinate transforming means 62. Accordingly, according to this embodiment, the drawing operation is performed every 0.5 seconds except for a case where an instruction is supplied from an external operation.

Next, the outline of the bird's-eye view display will be described with reference to FIG. 6.

When a map is displayed, a printed map table or a conventional navigation system provides a plan-view map display in which the ground is viewed from an infinite point. The plan-view map display has an advantage that the scale is fixed over any position on the same display frame, so that the user can easily get the sense of distance. However, when two points are required to be displayed on the same display frame, it is necessary to perform an adjustment operation of optimizing the scale. In addition, when the two points are far away from each other, only limited information is displayed because the information amount to be displayed at the same time is restricted by the size and precision of the display. This problem can be avoided by using the bird's-eye view display.

The bird's-eye view display can be achieved by the perspective projection processing in which two-dimensional or three-dimensional map information 53 of a plane A is projected onto a plane B intersecting the plane A at an angle θ, to thereby obtain projection information 54.

Figure 6:
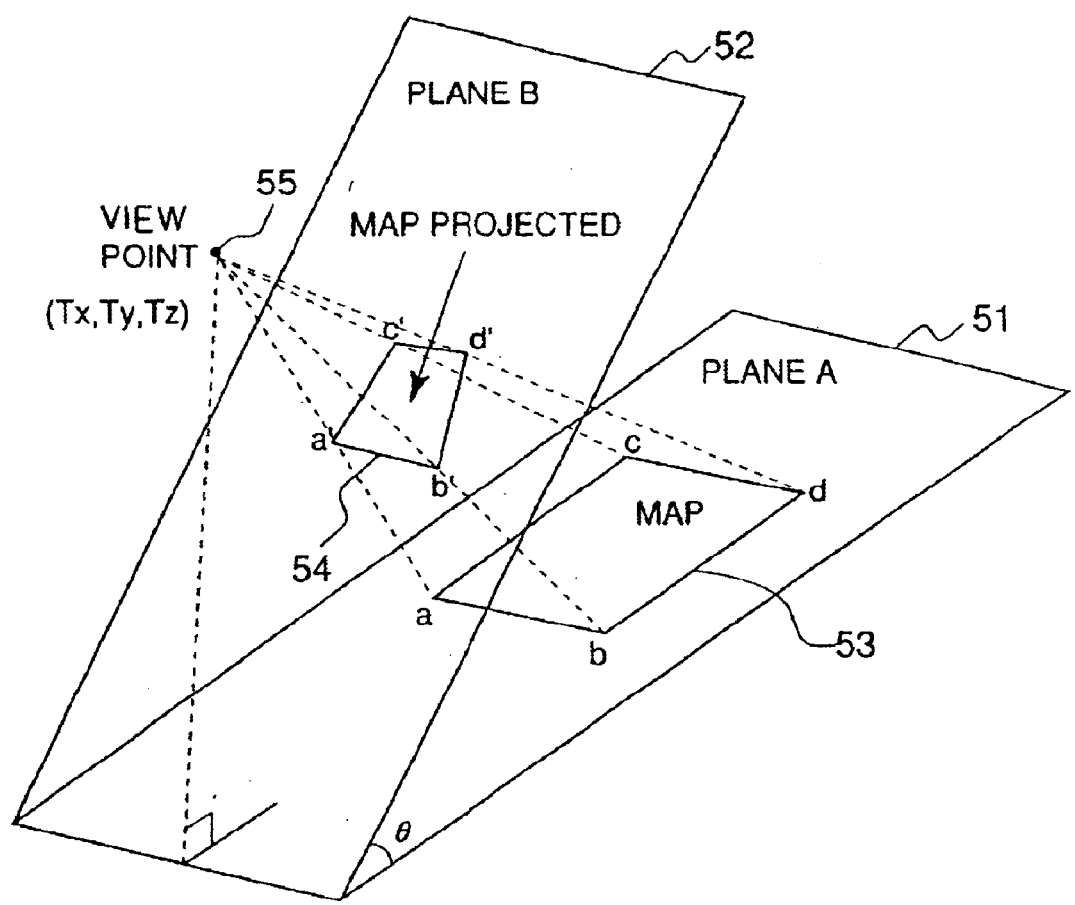
FIG. 6 is a diagram showing a perspective projection processing of a map.

In the schematic diagram of FIG. 6, a point 55 of coordinate (Tx, Ty, Tz) is set as a view point, and a map 53 (represented by a rectangle having vertexes a, b, c and d) on the plane A (illustrated by a rectangle 51) is projected onto the plane B (illustrated by a rectangle 52) which intersects the plane A at an angle 0, to obtain a projection 54 (represented by a rectangle having vertexes a', b', c' and d'). The points a, b, c and d of the map 53 are projected to the points a', b', c' and d'. In this specification, the view point 55 which is the origin of a visual-point coordinate system in the projection processing is merely referred to as "view point". Further, in this specification, the term "view point" does not mean a view point corresponding to the position of the user's eyes.

In the bird's-eye view display, information close to the view point 55 (for example, line ab) is enlarged, and information which is far away from the view point (for example, line cd) is reduced. Accordingly, when two points are displayed on the same display frame, these points are displayed so that one point for which more detailed information is desired is located near to the view point, while the other point is located far away from the view point. In this case, the positional relationship (interval distance, etc.) between the two points can be easily recognized, and a large amount of information on the periphery of the view point can be provided to the user.

According to this embodiment, since two-dimensional map data are usable as map information for the bird's-eye view display, the bird's-eye view display can be realized in the conventional navigation system with no additional new map data, by adding means for performing the perspective projection processing as described above. In this embodiment, the perspective projection processing is performed by the coordinate transforming means 62. Further, it is preferable to use various means of implementation as described later, when the bird's-eye view display is performed.

Figure 7:
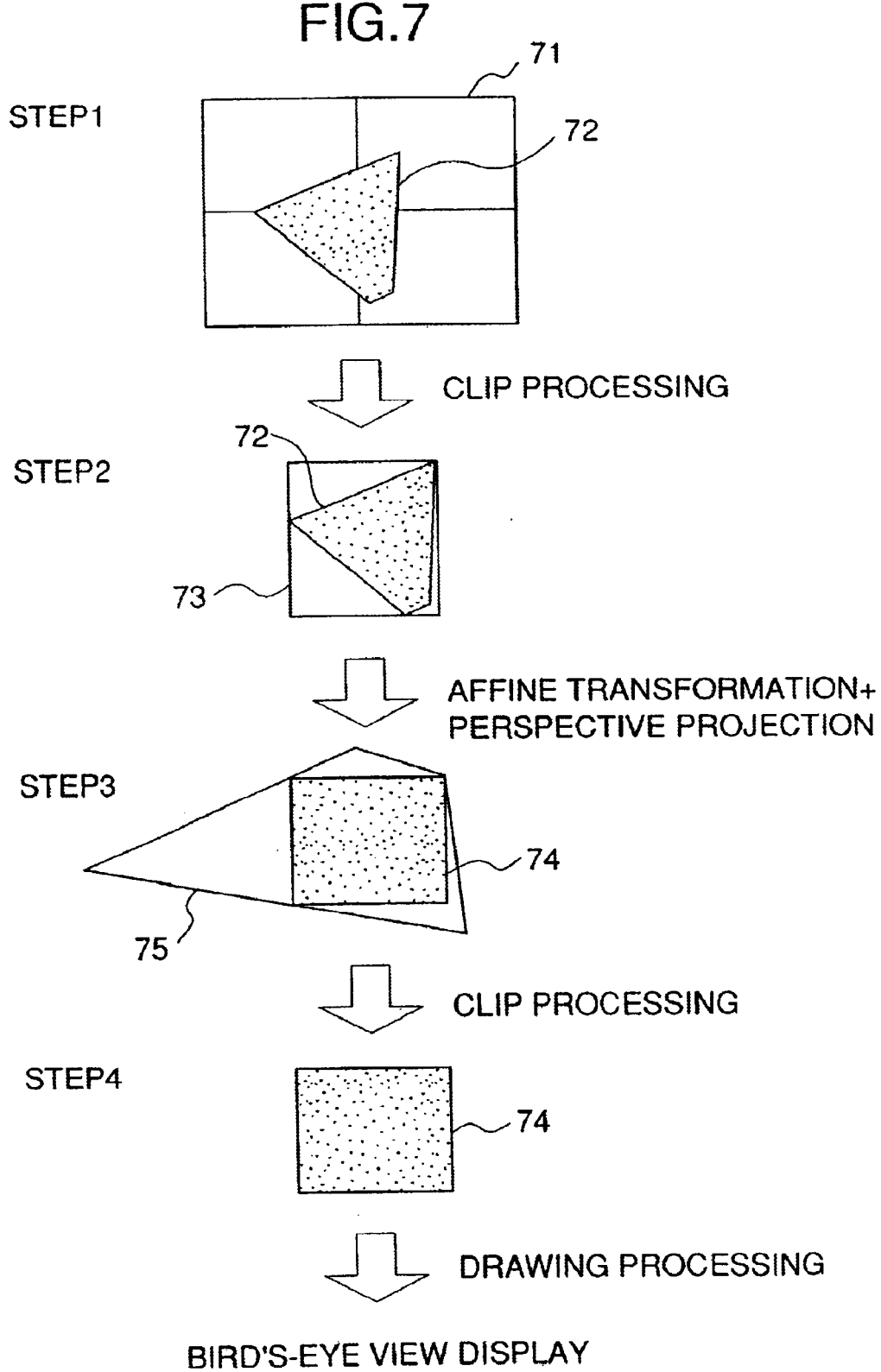
FIG. 7 is a diagram showing a series of coordinate transforming steps for bird's-eye view display.

First, a basic method of realizing the bird's-eye view display will be described with reference to FIG. 7.

The coordinate transforming means 62 sets the position of the view point, and determines a viewing direction from the view point and a projection angle (an angle θ at which the projection plane B intersects to the plane A in the case of FIG. 6) (step 1). In this step, a region which is to be displayed in the bird's-eye view mode is determined. When a bird's-eye view is displayed on a rectangular display frame (screen), a near-distance region which is close to the view point is narrowed, and a far-distance region which is far away from the view point is broadened. Therefore, map data to be finally drawn becomes a trapezoidal region 72 in a map mesh 71.

Next, the coordinate transforming means 62 uses the initial data clip means 61 to extract map data of a circumscribed rectangular region 73 of the trapezoidal region 72 to be actually drawn, from map mesh data 71 containing the region to be displayed in the bird's-eye view mode (step 2).

Subsequently, the coordinate transforming means 62 enlarges or reduces the extracted data, and then subjects the data to affine transformation to erect the trapezoidal region. Further, it performs data conversion on each coordinate value of the map data by using the perspective projection processing (step 3). At this time, the coordinate transformation based on the affine transformation is represented by the following equation (1): where $\phi$ represents the rotational angle of the map, (x, y) represents the coordinate value of the map data before the affine transformation, and (x', y') represents the coordinate value of the map data before the affine transformation, $$\begin{pmatrix} x' \\ y' \end{pmatrix} = \begin{pmatrix} \cos\phi & -\sin\phi \\ \sin\phi & \cos\phi \end{pmatrix} \begin{pmatrix} x \\ y \end{pmatrix}. \quad (1)$$

The coordinate transformation in the perspective projection processing is represented by the following equations (2) and (3): where (Tx,Ty,Tz) represents the position coordinate of the view point, θ represents the intersection angle between the planes A and B, (x,y) represents the coordinate value of the map data before the transformation, and (x',y') represents the coordinate value of the map data after the transformation, $$x'=(Tx+x)/(Tz+y \cdot \sin \theta) \quad (2)$$

$$y'=(Ty+y \cdot \cos \theta)/(Tz+y \cdot \sin \theta) \quad (3)$$

In step 3, a drawing target region which is the trapezoid 72 in the step 2 is converted to the rectangular region 74, and the circumscribed rectangle 73 of the trapezoid 72 is coordinate-transformed to a rectangle 75 which is circumscribed around the rectangle 73. It is not necessary to draw regions other than the drawing target region 74 in the rectangle 75. Therefore, the coordinate transforming means 62 uses the data clip means 64 to perform the clip processing on the regions other than the rectangle region 74 which is the drawing target, thereby removing these regions (step 4).

The map data thus obtained are transmitted to the drawing command issuing means 65. The drawing command issuing means 65 generates a drawing command on the basis of the transmitted map data and supplies the drawing command to the graphics processing unit 49 to prepare drawing data. The graphics processing means 49 prepares the drawing data and stores the data into the VRAM 26, and instructs the display 2 to display the data. The display 2 displays the drawing data held in the VRAM 26 on the screen thereof. With the above operation, the bird's-eye view 102 shown in FIG. 1 is displayed on the screen of the display 2.

The bird's-eye view display facilitates recognition of the directional and positional relationship between any two points. In addition, the bird's-eye view display suitable for use in a case where detailed information on the periphery of a point is required to be provided whereas rough information on the peripheries of the other points is sufficient. As described above, when detailed information or rough information on the periphery of a specific point is supplied, the coordinate of the specific point may be predetermined. Alternatively, the position may be set by determining a coordinate which satisfies a predetermined condition, or the position of the point may be input externally.

According to the navigation system, in many cases the current position is set to one of the above two points. The position information of the current position is obtained by the current position calculating means 45 or the map match processing means 46. Therefore, when the current position is indicated to any one of a detailed information display position and a rough information display position through the input device 5, the map drawing means 44 uses-the coordinate of the current position which is obtained by the current position calculating means 45 or the map match processing means 46.

However, when an instruction of a position on the map displayed on the screen is received and the instructed position is set as either the detailed information display position and the rough information display position, in many cases the user performs a scroll display on the map to search for the position for which the detailed information or rough information is displayed. However, the scroll-speed in the bird's-eye view display is low because the overall drawing operation must be repeated again every time a region to be displayed is changed. Accordingly, when the scroll display is used very frequently, the bird's-eye view display mode is inconvenient.

Figure 8:
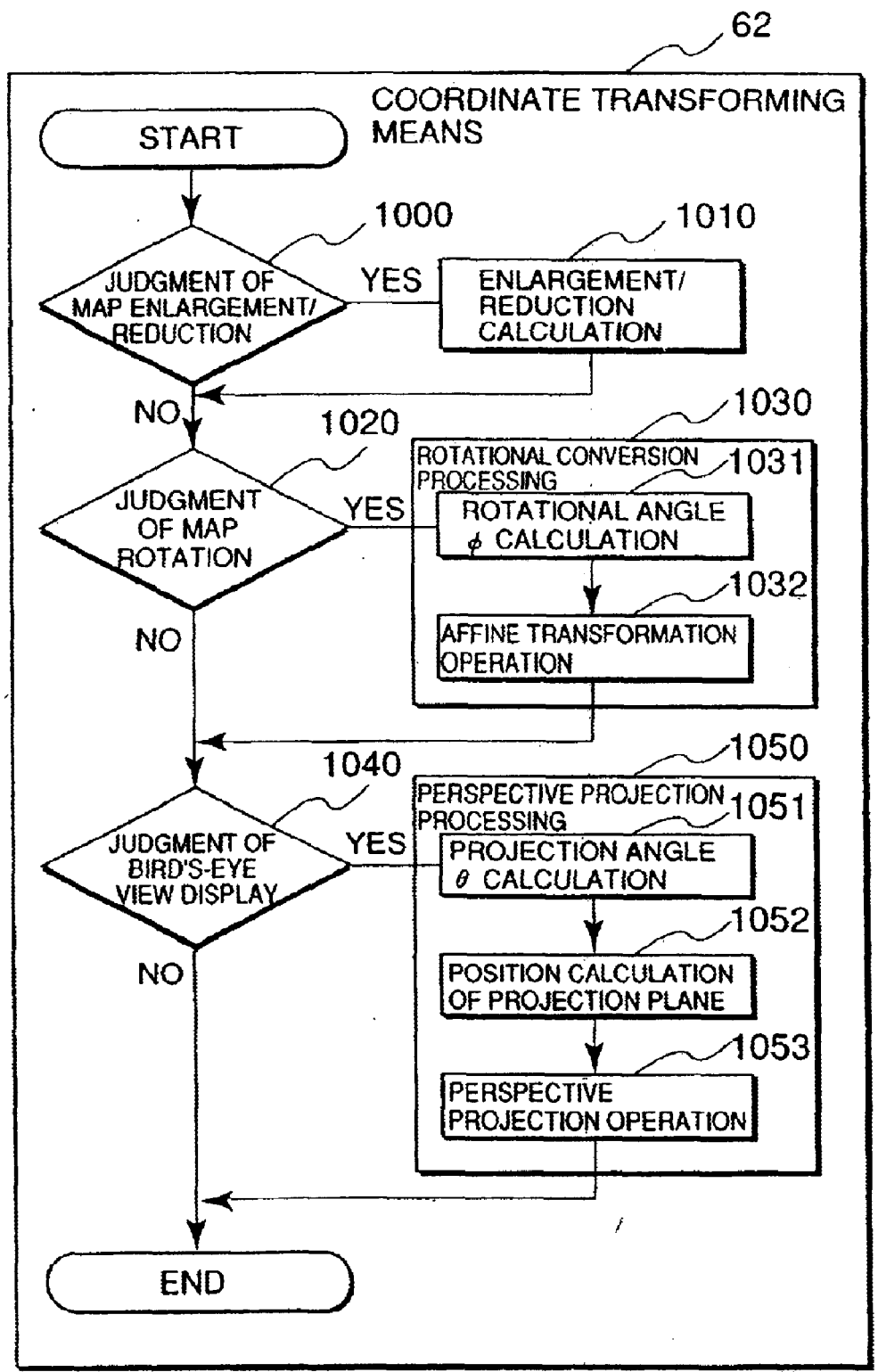
FIG. 8 is a flowchart for a processing flow of the coordinate transforming means.

In order to solve this problem, this embodiment adopts the processing shown in FIG. 8 in the coordinate transformation.

First, the coordinate transforming means 62 performs an enlarging or reducing operation for a region to be processed (step 1010) if the map is required to be enlarged or reduced (step 1000), and also performs a rotational transformation processing (step 1030) if the map is required to be rotated (step 1020). The rotational transformation processing (step 1030) contains a rotational angle calculating operation (step 1031) and an affine transforming operation (step 1032).

Subsequently, the coordinate transforming means 62 judges whether the bird's-eye view display is performed (step 1040). Here, for example when an instruction to search for any point from the map is input through the input device 5, or when an instruction for display of the plan-view map is input through the input device 5, the coordinate transforming means 62 judges that the perspective projection (conversion) is not performed in the bird's-eye display judgement (step 1040), and finishes the coordinate transformation processing without performing the perspective projection processing (step 1050). In this case, the plan view map is displayed on the screen of the display 2 because the perspective projection processing is not performed.

According to this embodiment, when any point on the map is searched for, the map is not displayed in the bird's-eye view display mode, but displayed in the plan-view display mode, so that the search target point can be rapidly searched for.

Further, for example when an instruction for displaying the bird's-eye view is input through the input device 5, or when any point is instructed as a destination through the input device 5 during the plan-view display, the coordinate transforming means 62 which receives these instructions through the user's operation analyzing means 41 judges, in the bird's-eye view display judgment in step 1040, that the perspective projection processing should be performed, and thus it performs the perspective projection processing (step 1050).

The perspective projection processing (step 1050) contains a projection angle calculation processing (step 1051), a projection-plane position calculation processing (step 1052) and a perspective projection operation (step 1053). With this processing, the map data which are notified to the drawing command issuing means 65 are converted to data for the bird's-eye view, and thus the map data which are prepared by the graphics processing means 49 and stored in the VRAM 26 also become data for the bird's-eye view. Accordingly, the map displayed on the display 2 is changed from the plan-view map to the bird's-eye view map.

As described above, the map can be freely changed from the bird's-eye view map to the plan-view map or from the plan-view map to the bird's-eye view map. Therefore, according to this embodiment, an easily-understandable map display can be provided.

Further, when the display frame is switched from the plan-view frame to the bird's-eye view frame in the above processing, or when the switching of the plan-view map to the bird's-eye view map or from the bird's-eye view map to the plan-view map is instructed through the input device 5 or the like, it would be difficult for the user to recognize the map if the switching operation between the plan-view map and the bird's-eye view map is rapidly performed, because the display style of the map varies greatly on the screen. Therefore, it is preferable that the shift between the plan-view map and the bird's-eye view map is performed gradually.

In this embodiment, when the display frame switching operation from the plan-view map to the bird's-eye view map is required, the projection angle θ is gradually increased from 0° with a time lapse (every 0.5 seconds in this embodiment) during the projection angle θ calculation (step 1051) in the perspective projection processing (step 1050), and this increase of the projection angle is stopped until the projection angle reaches a target projection angle. In this case, the increment unit of the projection angle is preferably set to a constant value.

As described above, the plan-view display is smoothly shifted to the bird's-eye view display by performing the perspective projection processing (step 1053) while increasing the projection angle with variation of time, so that the user can easily grasp the positional relationship between the places (spots) in the plan-view map and the bird's-eye view map. When the switching operation from the bird's-eye view display to the plan-view display is performed, the same effect can be obtained by gradually reducing the projection angle from an initially-set projection angle to 0° in time series.

Next, a method of determining the intersection angle θ (projection angle) between the map and the projection plane which is a perspective projection parameter in the bird's-eye view display, and the coordinate of the origin (Tx, Ty, Tz) of a view point coordinate system containing the projection plane, which is viewed from an object coordinate system containing the plane of the map, that is, the position of the projection plane, will be described with reference to FIGS. 8 and 9A–9C.

It is generally desired for the navigation system to display a place at which the user's vehicle runs, that is, the periphery of the current position of the vehicle, in more detail.

Figure 9A:
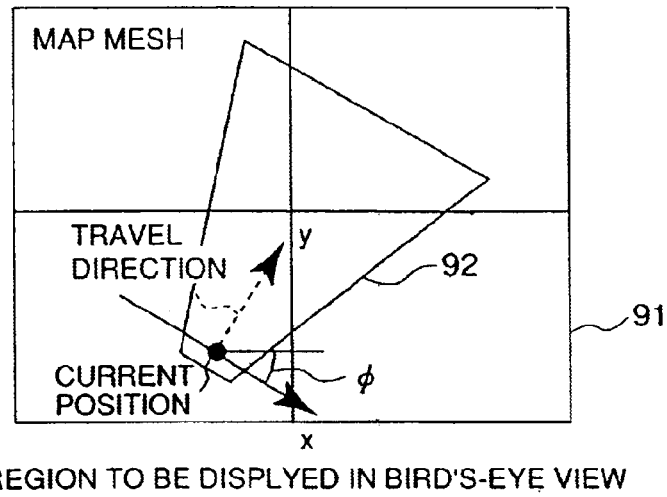
FIGS. 9A, 9B and 9C are diagrams showing a setting method of a view point and a projection plane for bird's-eye view display.
Figure 9B:
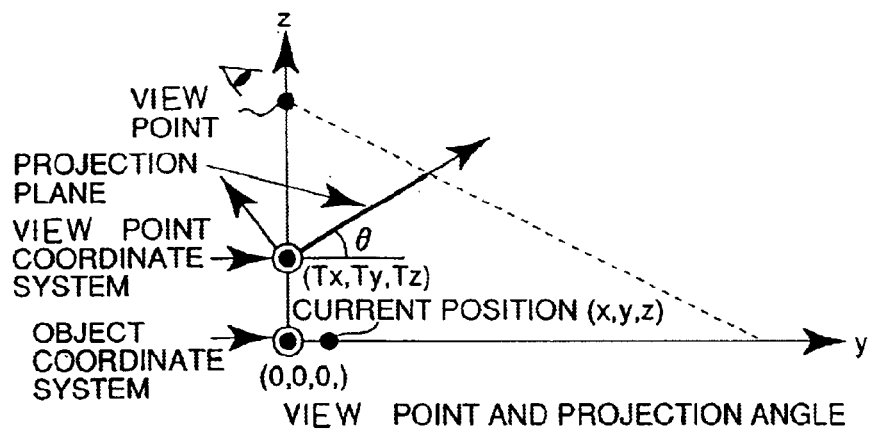
Figure 9C:
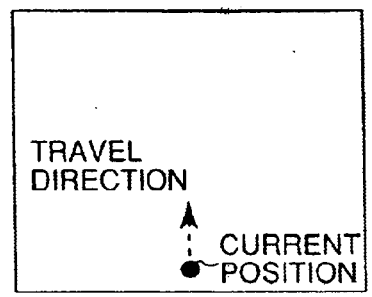

Therefore, the case where the bird's-eye view is displayed such that the current position is located at the central lower side of the screen as shown in FIG. 9C will first be described. In this case, the front side of the current position of the vehicle in a vehicle travel direction and a road map along which the vehicle has travelled until now is displayed in the bird's-eye view display mode. Reference numeral 92 in FIG. 9A represents a visual field (corresponding to a range to be drawn and displayed in the bird's-eye view display mode) in a map mesh 91, and the visual position and the projection angle to obtain a bird's-eye view are shown in FIG. 9B. In FIG. 9C, the current position and the vehicle travel direction in the bird's-eye view display are shown. Arrows as indicated by dotted lines in FIGS. 9A and 9C represent the vehicle travel direction.

In order to achieve the bird's-eye view display as shown in FIG. 9C, the coordinate transforming means 62 first performs a desired enlargement/reduction processing (step 1000 and 1010), and then judges that the rotation is needed (step 1020) to determine an intersection angle $\phi$ between the vector of the travel direction and the bottom side of the map mesh as shown in FIG. 9A (step 1031). Further, the coordinate transforming means 62 performs the affine transformation on the map data to rotate the data by an angle 4 (step 1032).

Since whether or not the bird's-eye view display is to be performed is judged in step 1040, the coordinate transforming means 62 performs the processing of determining the projection angle and the visual position (steps 1051 and 1052).

If the projection angle $\theta$ is set to a value close to 0°, the difference in scale between the near-distance point and the far-distance point of the view point is reduced. On the other hand, if the projection angle $\theta$ is set to a value close to 90°, the difference in scale between the near-distance point and the far-distance point is increased. In this embodiment, the projection angle $\theta$ is normally set to about 30° to 45°.

In this embodiment, the coordinate transforming means 62 changes the projection angle $\theta$ in accordance with an angle changing direction instruction (input through the projection angle changing key 68) which is input from the user's operation analyzing means 41. That is, upon detection of the angle-increasing instruction key 68a being pushed down, the user's operation analyzing means 41 instructs the increase of the projection angle to the coordinate transforming means 62. Further, every time the user's operation analyzing means 41 detects that the angle-increasing instruction key 68a has been pushed down for 0.5 seconds from the projection angle increasing instruction, as described above, it instructs the increase of the projection angle to the coordinate transforming means 62. In response to the projection angle increasing instruction, the coordinate transforming means 62 increases the projection angle $\theta$ by 5° (that is, the projection angle rises up by 5°). The same action is made for the projection angle reducing instruction. That is, for every 0.5 seconds that the angle-reducing instruction key 68b continues to be pushed down, the user's operation analyzing means 41 instructs the reduction of the projection angle to the coordinate transforming means 62, and in response to this instruction the coordinate transforming means 62 reduces the projection angle $\theta$ by 5° (that is, the projection angle falls by 5°).

With this above operation, the user can freely set a map region to be displayed in the bird's-eye view display mode. Accordingly, when the increase of the projection angle is instructed, those regions which are farther away from the current position are displayed on the map because the projection angle $\theta$ increases. On the other hand, when the reduction of the projection angle is instructed, those regions which are in the neighborhood of the current position are displayed on the map because the projection angle $\theta$ decreases.

Subsequently, the coordinate transforming means 62 determines the position of the projection plane (Tx, Ty, Tz) so that a differential value ($\Delta x$, $\Delta y$, $\Delta z$) obtained by subtracting the position of the projection plane (Tx, Ty, Tz) from the current position (x, y, z) is equal to a fixed value at all times (step 1052). Further, the coordinate transforming means 62 sets, as an absolute quantity, $\Delta x$ to zero and $\Delta z$ to a small value (when it is displayed in a small reduced scale to meet the scale of the map) or a large value (when it is displayed in a large reduced scale). Normally, $\Delta z$ may be selected so that the scale of the plan-view display is coincident with the scale of a point around the center of the bird's-eye view display.

The scale of the map is preferably changeable in accordance with a user's demand. In this embodiment, the coordinate transforming means 62 changes the scale of the map to be displayed in accordance with a scale changing instruction from the user's operation analyzing means 41 (which is input by the scale changing key 67). That is, when detecting that the enlargement instruction key 67a has been pushed, the user's operation analyzing means 41 outputs the enlargement instruction to the coordinate transforming means 62. Further, it instructs the enlargement to the coordinate transforming means 62 every 0.5 seconds it is detected that the enlargement instruction key 67a continues to be pushed down from the instruction of the enlargement. In response to the enlargement instruction, the coordinate transforming means 62 increases $\Delta z$ by a predetermined value in step 1052. The same action is made for the reduction instruction. The user's operation analyzing means 41 instructs the scale reduction to the coordinate transforming means 62 every 0.5 seconds when the reduction instruction key 67b and the reduction instruction key 67b continue to be pushed down, and in response to this instruction the coordinate transforming means 62 reduces $\Delta z$ by a predetermined value.

Figure 15A:
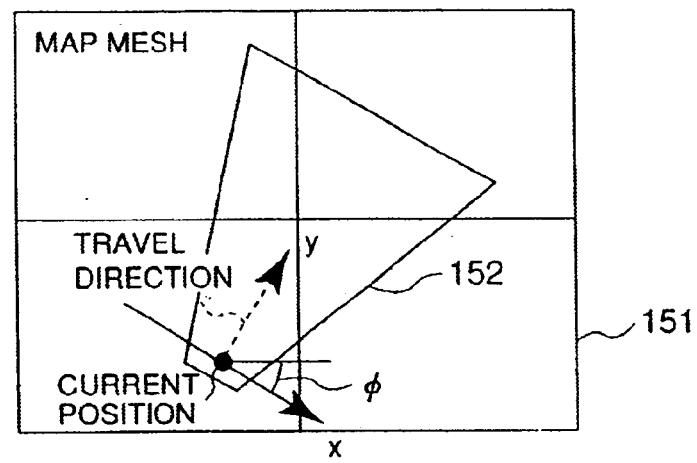
FIGS. 15A, 15B and 15C are diagrams showing a setting method of a view point and a projection plane for bird's-eye view display.
Figure 15B:
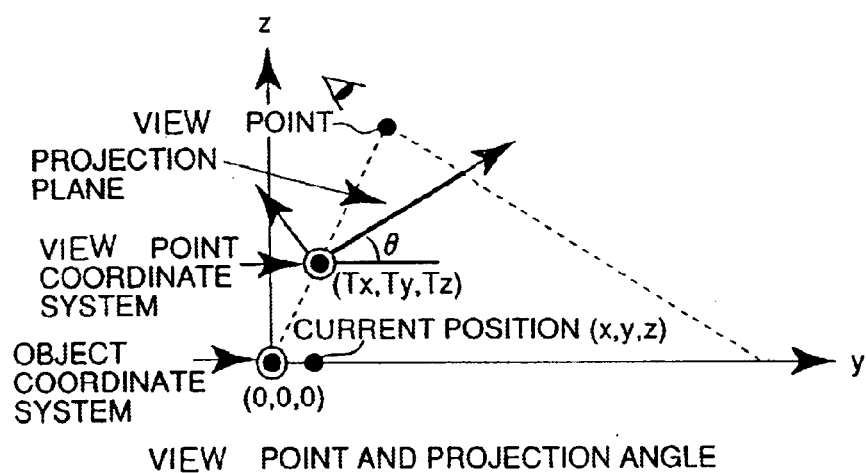
Figure 15C:
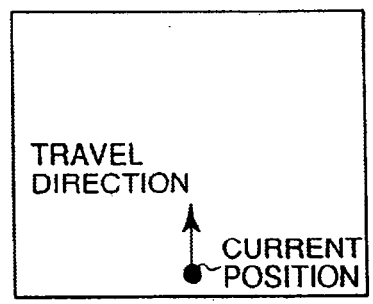

In this embodiment, $\Delta y$ may be set to a negative value as shown in FIGS. 9A to 9C, however, it may be set to a positive value as shown in FIGS. 15A to 15C. Further, according to this embodiment, the bird's-eye view can be displayed with no problem both when the view point position is at the front side of the current position and when it is at the rear side of the current position. FIGS. 15A to 15C are diagrams for obtaining a bird's-eye view of the same range as shown in FIGS. 9A to 9C, in which the view point is set to a different position. In FIG. 15A, reference numeral 152 represents a visual field (a range to be drawn and displayed) in a map mesh 151, and the visual position and the projection angle for obtaining a bird's-eye view are shown in FIG. 15B. Further, the current position and the vehicle travel direction in the obtained bird's-eye view are shown in FIG. 15C. Arrows as indicated by dotted lines in FIGS. 15A and 15C represent the vehicle travel direction.

In this embodiment, the coordinate transforming means 62 determines the position of the view point (specifically, $\Delta y$) in accordance with the view point position (input by the touch sensor 70) instructed by the user's operation analyzing means 41. That is, upon detection of the touch sensor 70 being touched, the user's operation analyzing means 41 indicates the touch position to the coordinate transforming means 62. In response to this indication of the position information, the coordinate transforming means 62 sets $\Delta y$ to such a value that the view point is coincident with the indicated position.

As described above, according to this embodiment, Δy can be set to any value within a broad range containing positive and negative values in accordance with the user's instruction. Accordingly, the position to be displayed in detail can be set more flexibly.

Finally, the coordinate transforming means 62 performs the perspective projection processing on each coordinate value of the map data by using the projection angle θ and the position of the projection plane (Tx, Ty, Tz) thus obtained (step 1053). Thereafter, the graphics processing means 49 performs the drawing processing with the obtained map data, whereby the map display is performed on the screen such that the travel direction is set to the up-direction at all times and the current position is displayed at the same point on the screen in the bird's-eye view display mode, as shown in FIG. 9C and FIG. 15C.

As described above, in the navigation system, it is generally desired that the point at which the user travels at present, that is, the periphery of the current position, is displayed in more detail. Therefore, in the navigation system of this embodiment, the current position is displayed at the central lower side of the screen as shown in FIGS. 9C, 10C, 15C and 16C.

According to the navigation system of this embodiment, indication of a destination can be accepted through touching of to the touch panel 70. Further, when the destination is indicated, the destination is drawn so as to be contained in the visual field (range to be drawn on the display frame). At this time, the coordinate transforming means 62 determines the rotational angle φ so that the current position is located at the central lower side, and the destination is located at the center upper side (in FIGS. 10C and 16C).

Figure 10A:
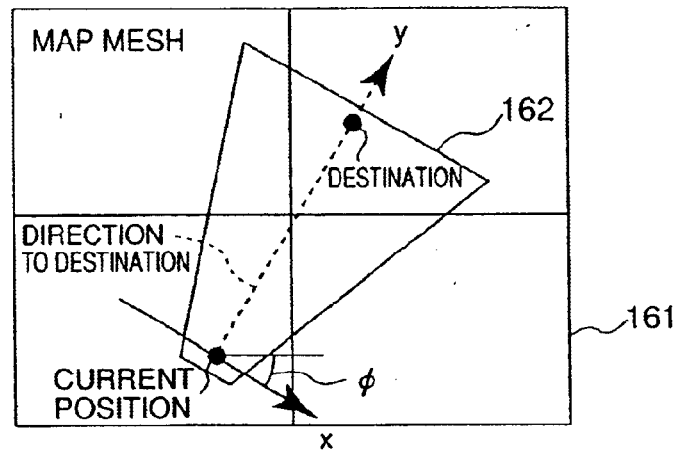
FIGS. 10A, 10B and 10C are diagrams showing a setting method of a view point and a projection plane for bird's-eye view display.
Figure 10B:
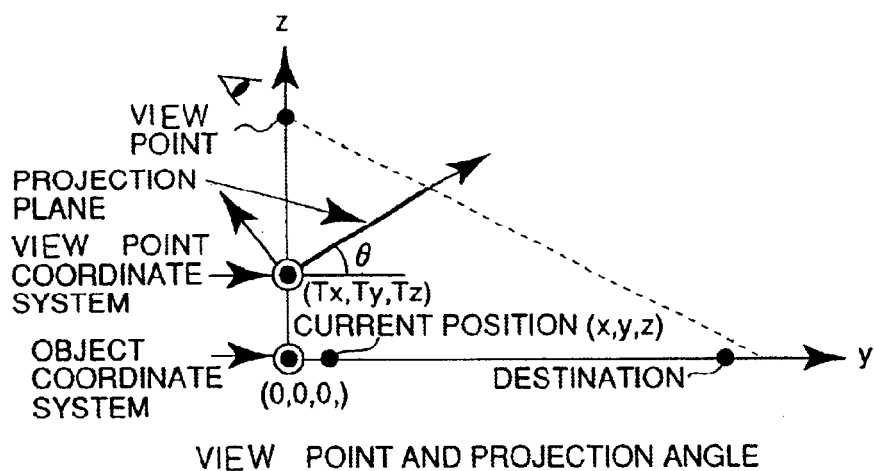
Figure 10C:
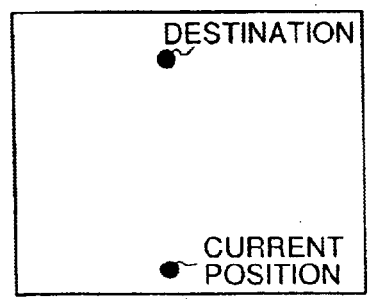
Figure 16A:
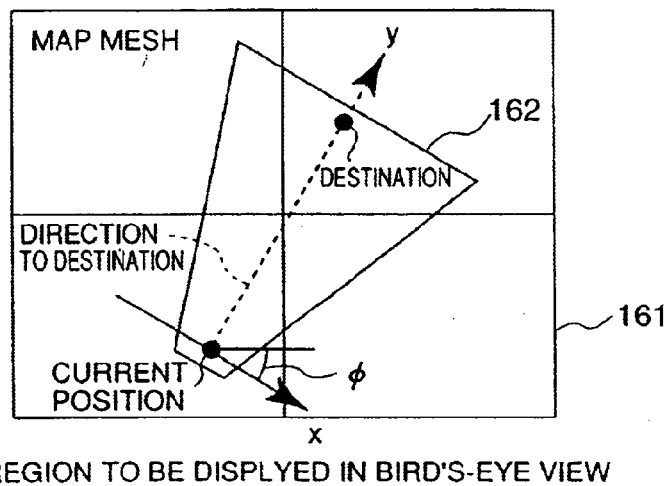
FIGS. 16A, 16B and 16C are diagrams showing a setting method of a view point and a projection plane for bird's-eye view display.
Figure 16B:
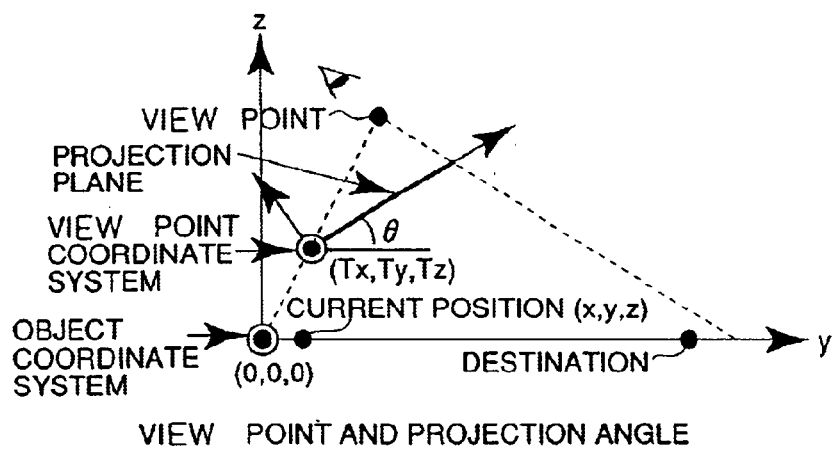
Figure 16C:
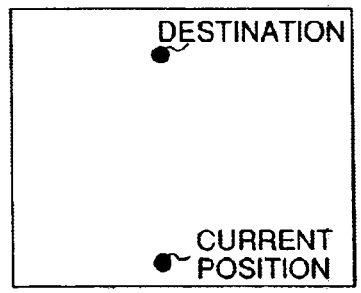

A bird's-eye view display method in the above case will be described with reference to FIG. 8, FIGS. 10A to 10C and FIGS. 16A to 16C. FIGS. 10A to 10C are diagrams showing a case of obtaining a bird's-eye view display in which both the current position and the destination are drawn on the same frame (field of view), and FIGS. 16A to 16C are diagrams showing a case of obtaining a bird's-eye view display of the same range as show in FIGS. 10A to 10C, in which the view point is set to a different position. A field of view (range to be drawn and displayed) 162 is shown in a map mesh 161 in FIGS. 10A and 16A, the view point position and the projection angle for obtaining the bird's-eye view are shown in FIGS. 10B and 16B, and the current position and the position of the destination in the obtained bird's-eye view display are shown in FIGS. 10C and 16C. Arrows indicated by dotted lines represent the direction from the current position to the destination.

In the following description, the current position is displayed at the central lower side of the screen, and the destination is displayed at the central upper side of the screen. The same processing is performed in a case where the display positions of any two points are selectively set to the central lower and upper sides of the screen in accordance with an instruction of the display positions of the two points.

In order to achieve the bird's-eye view displays shown in FIGS. 10C and 16C, the coordinate transforming means 62 calculates an intersection angle ¢ between the bottom side of the map mesh and a line perpendicular to a line connecting the current position and the destination a shown in FIGS. 10A and 16A in step 1031, and performs the affine transformation on each coordinate value of the map data to be drawn by the angle φ in step 1032.

Since it is judged in step 1040 that the bird's-eye view display is performed, the coordinate transforming means 62 shifts to the processing for determining the projection angle θ and the view point position (step 1051 and step 1052). As described above, the initial value of the projection angle θ is a predetermined value in the range of 30° to 40°, and it is changed in accordance with an input operation of the projection angle changing key 68. Further, as described above, the initial position of the projection plane is determined so that the differential value obtained by subtracting the position coordinate of the projection plane from the coordinate of the current position is equal to a predetermined value, and it is changed in accordance with an input operation of the reduction-scale instructing key 67. Further, the rotation of the coordinates is performed by using the transforming equations (2) and (3), and the affine transformation is performed by using the transforming equation (1). Further, the parameters Ty and Tz which indicate the position of the projection plane are calculated by substituting a suitable value, for example, zero into Tx, substituting the position coordinates and the display positions of the current point and the destination, and then solving a linear equation system.

Next, the coordinate transforming means 62 performs the perspective projection processing (step 1053). That is, the coordinate transforming means 62 performs the perspective projection on each coordinate value of the map data on the basis of the projection angle θ and the position of the projection plane thus obtained.

The graphics processing means 49 performs the drawing processing with the obtained map data, whereby the current position and the destination can be displayed on the same display frame. Further, if the above processing is performed every time the current position varies, the current position and the destination can be displayed at the same positions on the same display frame, even when the current position varies with time. Further, if the judgment of the step 1040 is set to judge the necessity of the perspective projection processing at all times during the bird's-eye view display, the display of the screen is changed at all times in accordance with the time variation. Further, if the judgment of the step 1040 is set to judge the necessity of the perspective projection processing only when the current position is shifted by a predetermined distance or more, only the mark 105 indicating the current position on the same bird's-eye view map is shifted until the current position is shifted by a predetermined distance, and the map display is varied to an enlarged map display as the current position is shifted by the predetermined distance and approaches the destination.

If the above processing is performed every time the current position is varied, and the current position and the position of the destination to be displayed on the screen are set to fixed positions, the map display could be gradually enlarged as the current position approaches the destination.

Further, if the projection angle θ is set to be reduced to a smaller value as the distance between the current position and the destination is shorter, the display mode is set to the bird's-eye view display to facilitate the understanding of the positional relationship between the current position and the destination when the current position and the destination are far away from each other, and set to a display mode near to the plan-view display when the current position approaches the destination. Conversely, the projection angle θ may be gradually increased to a larger value as the distance between the current position and the destination becomes shorter. In this case, when the current position is far way from the destination, the display mode is set to the plan-view display so that the overall positional relationship can be easily understood. As the current position approaches the destination, the visual-point position is gradually heightened to enhance the user's sense of distance.

Figure 11:
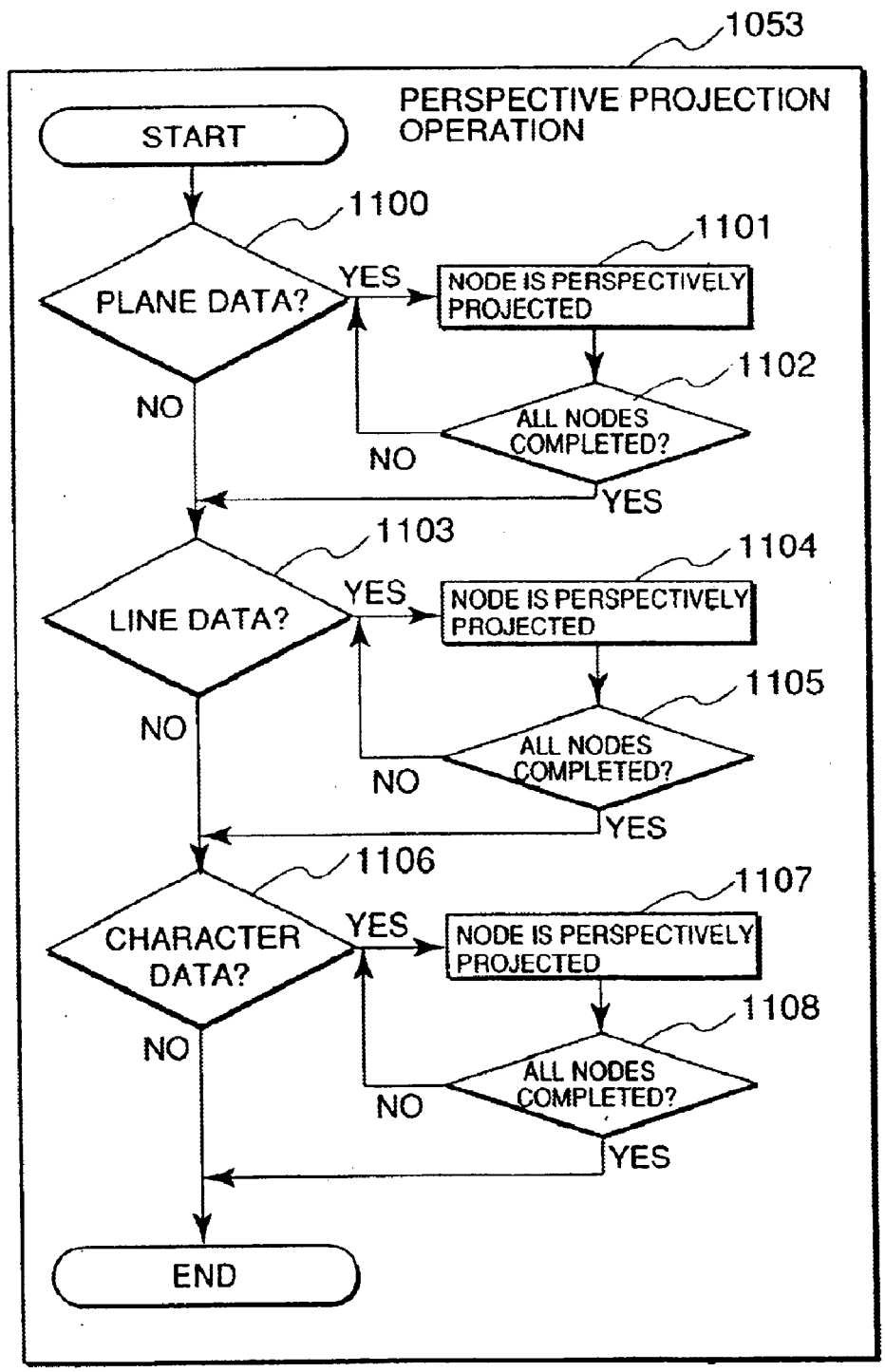
FIG. 11 is a flowchart for a flow of the perspective projection processing.

Next, a method of drawing character data in the bird's-eye view display will be described. First, the details of the perspective projection processing (step 1053) of the coordinate transforming means 62 will be described with reference to FIG. 11.

The coordinate transforming means 62 judges whether input map data are plane data (step 1100). If the input data are plane data, the coordinate transforming means 62 performs the perspective projection (step 1101) on each node coordinate value of the given plane data by using the parameters obtained by the projection angle θ calculation (step 1051) and the visual-point position calculation (step 1052). The perspective projection processing of the node (step 1101) is repeated until the processing on all input nodes is completed (step 1102).

Subsequently, the coordinate transforming means 62 subjects line data to the same processing as the plane data, to perform the perspective projection on the coordinate value of each node (steps 1103 to 1105).

When the processing on the line data is completed, the coordinate transforming means 62 judges whether the input map data are character data (step 1106). If the input data are judged to be character data, the perspective transforming means 62 performs the perspective projection on the coordinate values of drawing start points of given character strings by using the projection angle θ and the coordinate value of the visual-point position which are obtained in the steps 1051 and 1052. In this embodiment, no perspective projection is performed on a character image. The perspective projection processing of the node in step 1107 is repeated until the processing on all the input nodes is completed (step 1108).

When the graphics drawing is performed with the perspective projection result thus obtained, such a bird's-eye view map as the map 103 shown in FIG. 1 is obtained. According to this embodiment, since no perspective projection is carried out on the character image in step 1107 as described above, all the characters are drawn at the same size so as to be erect on the map as shown by the map 103 of FIG. 1.

Figure 12:
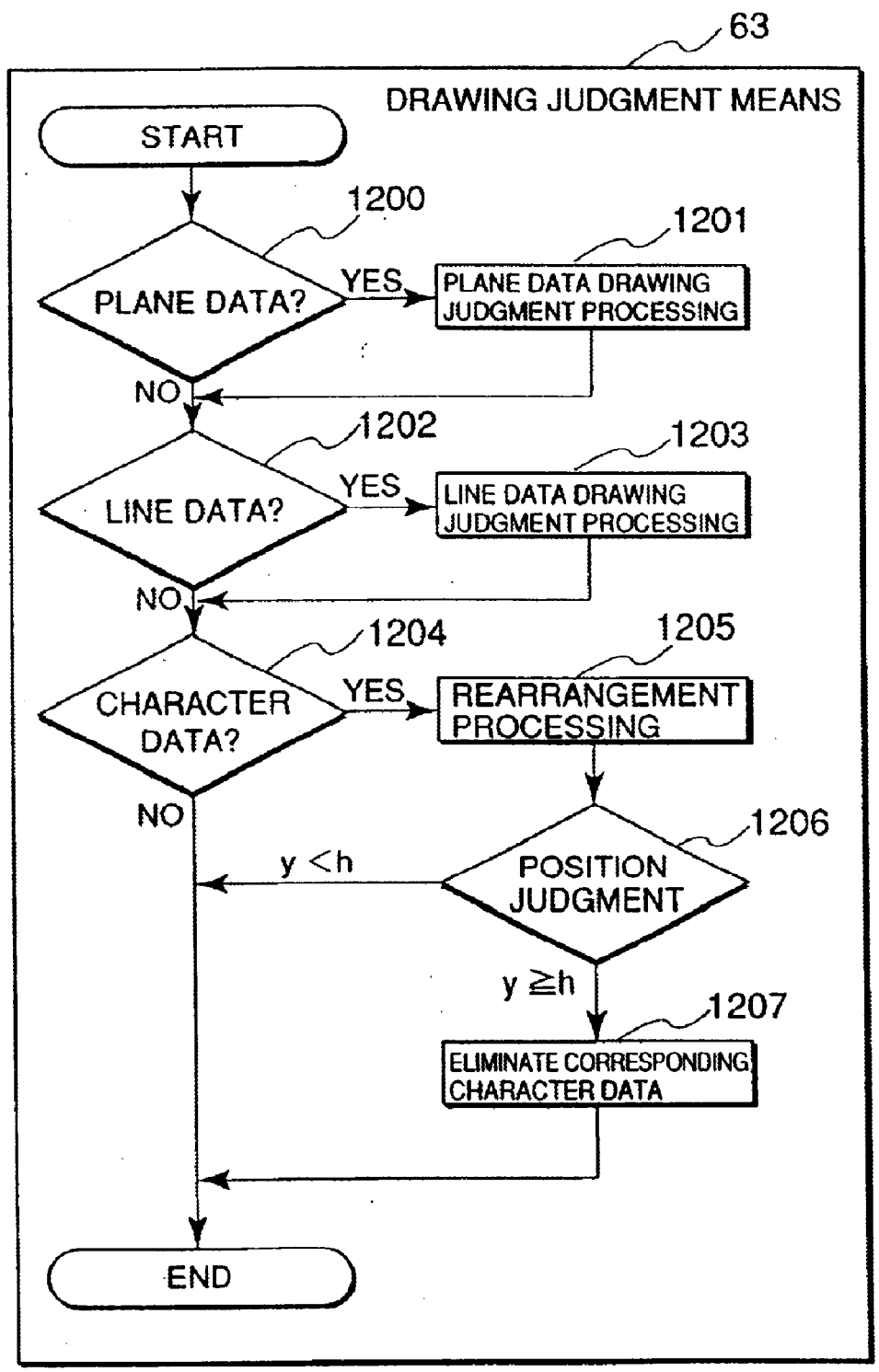
FIG. 12 is a flowchart showing a processing flow of drawing (display) judgment means.

Next, the processing of the drawing judgment means 63 will be described with reference to FIG. 12. The drawing judgement means 63 serve to judge whether each data item contained in the map data should be drawn.

First, the drawing judgment means 63 judges whether the input map data contain plane data (step 1200). If the plane data are judged to be contained, the drawing judgment means 63 performs a predetermined plane data drawing judgment processing (step 1201). The plane data drawing judgment processing (step 1201) which is carried out in this case serves to judge an attribute which is preset for each plane data and select desired plane data, for example.

When the processing on the plane data is completed, the drawing judgment means 63 subsequently judges whether the input map data contain line data such as roads, line backgrounds, etc. (step 1202). If the line data are judged to be contained, the drawing judgment means 63 performs a predetermined line data drawing judgment processing (step 1203). The line data drawing judgment (step 1203) which is carried out in this case serves to judge an attribute which is preset for each line data and select desired line data, for example.

When the processing on the line data is completed, the drawing judgment means 63 subsequently judges whether the input map data contain character data (step 1204). If the character data are judged to be contained, the drawing judgment means 63 performs rearrangement processing on the coordinate values of drawing start points of character strings to rearrange the character strings from the far-distance side to the near-distance side (step 1205).

Subsequently, the drawing judgment means 63 compares the height y of the drawing start point of each of the rearranged character strings with a predetermined height h on the display frame (step 1206). In this embodiment, when the height of the display frame is set to "1", the height h is set to the position corresponding to "⅔" from the bottom side of the display frame. That is, the height h is set to a predetermined fixed value. This is because when the height from the bottom side is set to ⅔ or more, the angle of depression is extremely small, and the density of nodes to be drawn is excessively high. However, this reference value (height h) may be set in accordance with the height of the view point or the like.

As a judgment criterion for the drawing of the character strings the distance from the view point may be used in place of the height from the bottom side of the display frame. For example, assuming the distance between the view point and the destination to be "1", only those character strings which are located at a distance of "⅔" or less from the view point are drawn, and those character strings which are located at a distance longer than "⅔" are eliminated from drawing targets.

If the height y of a drawing start point of a character string is judged to be lower than the height h as a position judgment result, the drawing judgment means 63 sets the character string as a drawing target. On the other hand, if the height y is judged to be higher than the height h, the drawing judgment means 63 eliminates the character string from the drawing targets (step 1207). In this embodiment, the graphics processing means 49 performs the drawing operation by using the map data which are selected by the drawing judgment means 63 as described above, so that the bird's-eye view display can be prevented from being made too intricate, and a clear and lucid display can be obtained.

Further, according to this embodiment, the drawing of a character string is determined on the basis of only the height of the display position thereof. In place of this method of determination, the following method may be used. That is, a display priority rank (order) is preset for each character string, and a range of the display ranks of character strings to be displayed is set in accordance with the display height (or distance from the view point) of the character strings. In this case, only the character strings to which the display ranks contained in the range are allocated are displayed. For example, the upper limit of the display ranks of the character strings to be displayed is set to a fixed rank irrespective of the height of the character string, but, the lower limit of the display ranks of the character strings is set to a higher rank in accordance with the height of the character string on the display frame. In this case, in an area close to the upper side of the display frame, only character strings having higher display priority ranks are displayed. On the other hand, in an area close to the bottom side of the display frame, not only character strings having higher display ranks, but also character strings having lower display ranks are displayed. Accordingly, when the current position is set to a position close to the bottom side of the display frame, more detailed character information can be obtained for an area as the area becomes closer to the current position. If the area is farther away from the current position, only important information is displayed. Accordingly, this display mode is very convenient for users.

Further, when an attribute (font of display character, meaning of character string, or the like) is previously allocated to each character string, the attribute may be used as another criterion for the display priority ranking. In this case, only characters having predetermined attributes may be displayed in each region.

If a character string is defined for a predetermined point serving as a destination, only the character string may be displayed.

The steps 1205 to 1207 may be omitted, but, these steps are preferably executed. The effect of these steps will be described with reference to FIGS. 13A, 13B, 14A and 14B.

Figure 13A:
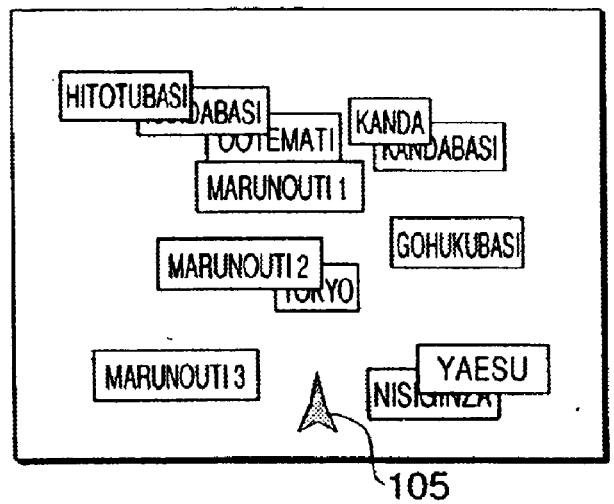
FIGS. 13A and 13B are diagrams showing an effect of a rearrangement operation of character strings.
Figure 13B:
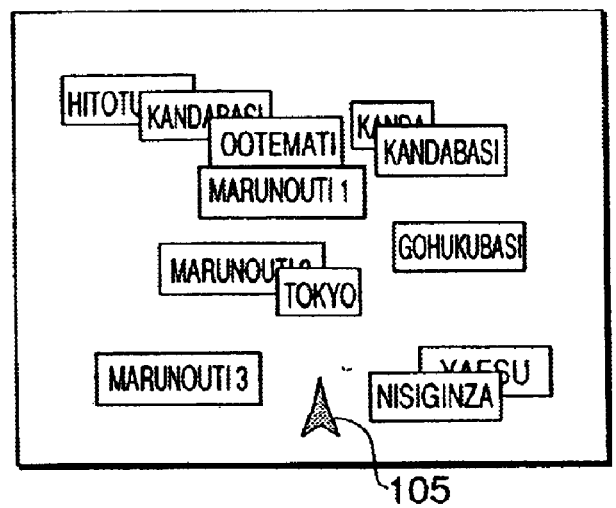
Figure 14A:
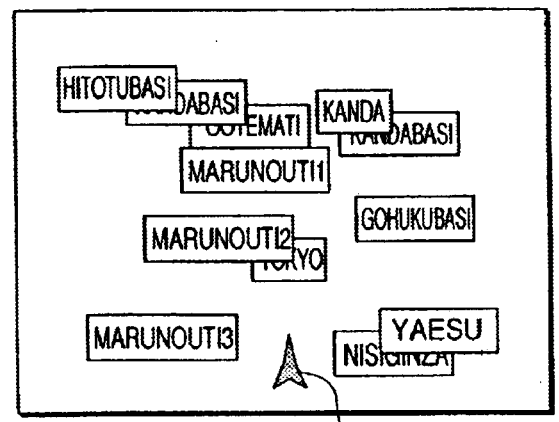
FIGS. 14A and 14B are diagrams showing an effect of a drawing (display) character string selecting operation.
Figure 14B:
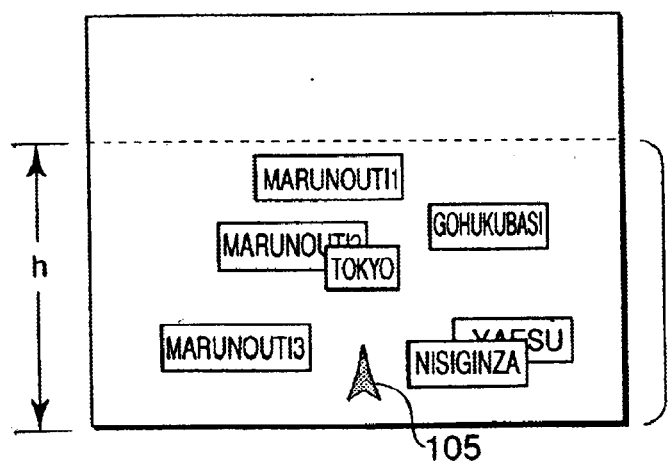

FIG. 13A shows a bird's-eye view map obtained when the drawing operation is carried out without performing the rearrangement processing and the drawing character string selecting processing of steps 1205 to 1207. FIGS. 13B and 14A shows a bird's-eye map obtained when the drawing operation is carried out together with performing the rearrangement processing of step 1205, but without performing the drawing character string selecting processing of steps 1206 and 1207. FIG. 14B shows a bird's-eye view map obtained according to this embodiment, that is, a bird's-eye view map obtained when the processing of steps 1205 to 1207 is performed. In FIGS. 13A to 14B, figures, etc. which are drawn on the basis of plane data and line data are omitted from the illustration.

When the bird's-eye view is displayed without performing the rearrangement processing of step 1205, character strings are displayed merely in a stored order of the character strings, irrespective of the distance to the view point, as shown in FIG. 13A. Therefore, a character string which is far away from the view point (a far-distance character string) may be displayed while superposed on a character string which is close to the view point (a near-distance character string).

On the other hand, in the case where the rearrangement processing of the character string of step 1205 is performed, if a far-distance character string is overlapped with a near-distance character string, the near-distance character string is displayed while superposed on the far-distance character string. Such a bird's-eye view display mode as described above is very preferable because as an area approaches the current position, this display mode makes it easier to read information for the area.

Further, in the case where the bird's-eye view is displayed without performing the drawing character string selecting processing of steps 1206 and 1207, as a character becomes farther away from the view point, the angle of depression of the character string with respect to the view point becomes smaller, so that the character string is reduced and compressed more and more, as shown in FIG. 14A. Therefore, the data amount of line, planes and characters to be drawn per unit area is increased. The character data of these data are drawn while superposed on the other data, so that the line and plane background data are hidden by the character data. Therefore, it is very difficult to read plane information such as remote roads, rivers, green zones, etc. from the display frame in the above bird's-eye view display.

On the other hand, according to this embodiment, in order to perform the drawing character string selecting processing of steps 1206 and 1207, character data in a range (character drawing range) extending from the bottom side of the display frame to the height h are drawn while the other data are not drawn as shown in FIG. 14B. Accordingly, in a bird's-eye view display obtained according to this embodiment, the plane information such as roads, rivers, green zones, etc. which are remote from the view point can be easily read from the display frame.

The bird's-eye view display apparatus and the navigation system according to this embodiment can display a map which is expressed in a bird's-eye view display mode. Accordingly, the user can obtain a clear map display in which the positional relationship can be easily recognized. In addition to this effect, the following effects are also expected to be obtained by this embodiment.

First, according to this embodiment, it's easy to switch between the plan-view display and the bird's-eye view display. Accordingly, both the plan view and the bird's-eye view can be displayed in accordance with the user's demand.

Secondly, according to this embodiment, when the bird's-eye view display and the plan-view display are switched, the intersection angle between a plane containing map data and a plane to which a map is projected is gradually increased or reduced in time series. That is, in the switching operation between the plan-view display mode and the bird's-eye view display mode, the view point to obtain the bird's-eye view is smoothly shifted. Accordingly, the user can easily recognize the positional correlation between the spots displayed on the plan-view map and the spots displayed on the bird's-eye view map because the shift between the plan-view map and the bird's-eye view map is performed smoothly.

Thirdly, according to this embodiment, the view point to obtain the bird's-eye view can be fixed to a position which is away from the current position at a fixed distance and in a fixed direction at all times. Further, the height of the view point can be varied in accordance with an input operation received externally. If the view point is fixed, the bird's-eye view is displayed such that the current position is fixed to a specific position on the screen at all times, so that the user can easily grasp the current position. Further, the view point can be set to any position desired by the user.

Fourthly, according to this embodiment, when the positions of two points (for example, a current position and a destination) are specified, the view point and the intersection angle between the plane containing the map data and the plane to which the map is projected are determined so that the two points are displayed at the specified positions on the screen, and the bird's-eye view display is performed on the basis of the above determination result. Accordingly, the user can easily recognize the positional relationship between the two points. Further, even when the distance between the two points varies, the two points are displayed on the same display frame at all times, so that the user can easily grasp the positional relationship between the two points with no complicated operation.

Fifthly, the coordinate transforming means of this embodiment performs no perspective projection processing on the character image. Accordingly, all characters contained in the bird's-eye view are displayed at the same size so as to be erect on a map, so that the user can easily read these characters.

Sixthly, the drawing judgment means of this embodiment sorts character data strings in accordance with the distance of the character data position to the view point on the map data. That is, as a character string approaches the view point, the character string is treated so as to have a higher display priority rank. Accordingly, the character data close to the view point can be prevented from being covered and missed by the other character data, so that character information close to the view point can be easily identified.

Seventhly, when a character string obtained through the perspective projection processing is located at a position higher than a predetermined height on the screen, the drawing judgment means of this embodiment eliminates the character string from drawing targets. The drawing judgment means may eliminate from the drawing targets those character strings which are defined at positions away from the view point at a predetermined distance or more. As described above, no character string is drawn in an area which is at a predetermined height or more or away from the view point at a predetermined distance or more, that is, in an area in which the data amount to be drawn per unit area is considerably increased due to reduction of the angle of depression in the bird's-eye view display. Therefore, the road display, the plane background display, etc. in this area are not covered by the character string display, so that the user can recognize far-distance roads, etc. with no obstruction.

According to the bird's-eye view display apparatus and the navigation system of the present invention, the map can be displayed in the bird's-eye view display mode. Accordingly, the user can obtain a map display in which the positional relationship between spots displayed on a map can be easily recognized.

What is claimed is:

1. A map display device comprising:
   instruction accepting means which accepts an instruction for switching between a planeview and a bird's-eye view;
   map creating means which creates one of a plane view map and a bird's-eye view map according to the instruction received by said instruction accepting means;
   display control means which displays the map created by said map creating means in a display device; and
   scroll operation accepting means which accepts a scroll operation for changing an area of said map to be displayed in said display device by said display control means;
   wherein said map creating means creates the plane view map regardless of the instruction received by said switching instruction accepting means when said scroll operation accepting means is accepting said scroll operation.

2. A map display device according to claim 1, further comprising:
   storage means which store map data therein, wherein said map creating means creates the plane view map based on said map data and the birds'-eye view map based on a result of perspective projection of said map data.

3. A map display method for a navigation system, which create a plane view map and a bird's-eye view map, accepts an instruction for displaying one of said plane view map and said bird's-eye view map, and displays said one according to said instruction thus accepted in a display device, wherein, said navigation system switches a map to be displayed from said bird's-eye view map to said plane view map in response to a scroll operation for changing an area of said map to be displayed by a user, regardless of said instruction thus accepted being an instruction for displaying said bird's-eye view map.

4. An operation processing unit for a map display device comprising:
   means which reads map data; and
   map drawing means for drawing a map based on said map data to display it in an image display device,
   wherein said map drawing means comprises:
      instruction accepting means which accepts an instruction for switching between a plane view and a birds'-eye view;
      map creating means which creates one of a plane view map and a bird's-eye view map according to the instruction received by said instruction accepting means;
      scroll operation accepting means which accepts a scroll operation for changing an area of said map to be displayed in said display device by said display control means,
   wherein said map creating means creates the plane view map regardless of the instruction received by said switching instruction accepting means when said scroll operation means is accepting said scroll operation,.

5. A map display device comprising:
   an image display device;
   an input device;
   map storage means which stores map data for displaying a map; and
   map drawing means which creates map drawing data using the map data read from said map storage means and display a map image in said image display device using said map drawing data,
   wherein said map drawing means comprises:
      coordinate transforming means which transforms coordinate data contained in said map data;
      instruction accepting means which accepts, via said input device, an instruction for switching between a plane view and a birds'-eye view;
      scroll operation accepting means which accepts, via said input device, a scroll operation for changing an area of said map to be displayed in said image display device;
      wherein said coordinate transforming means comprises:
         perspective projection means which creates birds'-eye view drawing data by perspective projection of the coordinate data contained in said map data; and
         control means which controls, according to the instruction from said instruction accepting means, said perspective projection means to execute perspective projection processing in case of a birds'-eye view displaying mode, or not to execute the perspective projection processing in the case of a plane view displaying mode, and further controls said perspective projection means so as not to execute the perspective projection processing regardless of the instructions accepted by said switching instruction accepting means when said scroll operation accepting means is accepting the scroll operation.

6. A navigation system comprising:
   an image display device;
   an input device;
   map storage means which stores map data for displaying a map; and
   map drawing means which creates map drawing data using the map data read from said map storage means and display an map image in said image display device using the map drawing data; and
   current position recognizing means which recognizes the own current position
   wherein said map drawing means comprising:
      coordinate transforming means which transforms coordinate data contained in said map data;
      instruction accepting means which accepts, via said input device, an instruction for switching between a plane view and a birds'-eye view; and
      scroll operation accepting means which accepts, via said input device, a scroll operation for changing an area of said map to be displayed in said image display device;
wherein said coordinate transforming means comprises:
perspective projection means which creates birds'-eye view drawing data by perspective projection of the coordinate data contained in said map data
control means which controls, according to the instruction from said instruction accepting means, said perspective projection means to execute perspective projection processing in case of a birds'-eye view displaying mode, or not to execute the perspective projection processing in case of a plane view displaying mode, and further controls said perspective projection means so as not to execute the perspective projection processing regardless of the instructions accepted by said switching instruction accepting means when said scroll operation accepting means is accepting the scroll operation.

* * * * *